United States Patent [19]

Kamanaka et al.

[11] Patent Number: 5,522,055
[45] Date of Patent: May 28, 1996

[54] ELECTRONIC FILE SYSTEM WITH PRE READ MEMORY MANAGEMENT OF DATA TO BE DISPLAYED

[75] Inventors: Nobuo Kamanaka, Chigasaki; Takashi Miura; Koji Kawano, both of Yokohama, all of Japan

[73] Assignee: Matsushita Graphic Communication Systems, Inc., Tokyo, Japan

[21] Appl. No.: 295,488

[22] Filed: Aug. 25, 1994

Related U.S. Application Data

[63] Continuation of Ser. No. 787,310, Oct. 30, 1991, abandoned.

[30] Foreign Application Priority Data

| Nov. 30, 1990 | [JP] | Japan | 2-338303 |
| Mar. 29, 1991 | [JP] | Japan | 3-066307 |
| Jun. 28, 1991 | [JP] | Japan | 3-158523 |
| Jul. 2, 1991 | [JP] | Japan | 3-161466 |
| Jul. 11, 1991 | [JP] | Japan | 3-170918 |
| Jul. 30, 1991 | [JP] | Japan | 3-189736 |

[51] Int. Cl.6 ................................. G06F 12/08
[52] U.S. Cl. ........................ 395/440; 395/463; 395/464; 364/DIG. 1; 364/263.1; 364/254.3; 364/243.4
[58] Field of Search ................................. 395/425, 164, 395/464, 439, 460, 463, 440; 345/203

[56] References Cited

U.S. PATENT DOCUMENTS

| 4,371,927 | 2/1983 | Wilhite et al. | 395/250 |
| 4,481,583 | 11/1984 | Muller | 395/725 |
| 4,604,687 | 8/1986 | Abbott | 395/600 |
| 4,654,819 | 3/1987 | Stiffler et al. | 395/425 |
| 5,025,431 | 6/1991 | Naito | 369/36 |
| 5,133,060 | 7/1992 | Weber et al. | 395/425 |
| 5,150,472 | 9/1992 | Blank et al. | 395/425 |
| 5,153,936 | 10/1992 | Morris et al. | 395/128 |
| 5,193,172 | 3/1993 | Arai et al. | 395/425 |

FOREIGN PATENT DOCUMENTS

| 0212425 | 3/1987 | European Pat. Off. . |
| 0383528 | 8/1990 | European Pat. Off. . |

*Primary Examiner*—Eddie P. Chan
*Assistant Examiner*—Reginald G. Bragdon
*Attorney, Agent, or Firm*—Lowe, Price, LeBlanc & Becker

[57] ABSTRACT

An electronic file system includes a recording-medium drive for driving one of a first recording medium and a second recording medium, a terminal device outputting access requirements, and a carrier mechanism for setting one of the first recording medium and the second recording medium into the recording-medium drive in response to an access requirement outputted from the terminal device. The electronic file system also includes a controller connected between the terminal device and the carrier mechanism for processing access requirements outputted from the terminal device to reduce a number of times of setting operation of the carrier mechanism. The controller is arranged so that while a first page of read-out data is being indicated by the terminal devices subsequent pages are pre-read and stored in a short term, fast memory designated for this purpose. Pre-reading of subsequent pages is allocated to terminal devices which have the smallest sum of store times where store time is constituted at a time during which a respective page is stored in the short term memory.

4 Claims, 40 Drawing Sheets

| PREREAD PAGE 1 | PREREAD　　　　　END/NOT END |
| --- | --- |
| | VOLUME·DOCUMENTS·PAGE |
| PREREAD PAGE 2 | PREREAD　　　　　END/NOT END |
| | VOLUME·DOCUMENTS·PAGE |

10-PAGE READ    13-PAGE READ    16-PAGE READ, 1-PAGE TRANSFER TO SURPLUS TABLE

TO SURPLUS TABLE 5,522,055

ELECTRONIC FILE SYSTEM WITH PRE READ MEMORY MANAGEMENT OF DATA TO BE DISPLAYED

This application is a continuation of application Ser. No. 07/787,310 filed Oct. 30, 1991 now abandoned.

TECHNICAL FIELD

This invention relates to an electronic file system including an information recording medium for storing files of information.

BACKGROUND ART

Some electronic file systems include information recording disks for storing files each having information representing documents. As the number of files increases and the mount of information in each file increases, a longer time is spent in the access to a desired file. Only a small portion of the access time is used in writing and reading information into and from an information recording disk. A great portion of the access time is used in selecting a desired disk and moving the selected disk to a disk drive.

Electronic file systems of a multi-disk-drive type have been developed in order to shorten an access time. The electronic file system of the multi-disk-drive type has a plurality of disk drives. In this electronic file system, while a first disk drive is executing information reading and writing processes on a first disk, a second disk can be moved to a second disk drive to shorten an access time. As will be explained later, a prior art electronic file system of the multi-disk-drive type has same problem.

With reference to FIG. 1, a prior art electronic file system of the multi-disk-drive types includes a plurality of work stations 1 (WS-A, WS-B, and WS-C), a file controller 2, a multi-drive controller 3, and a multi-drive section 4. The work stations 1 are also referred to as terminal devices.

Various commands can be inputted via the work stations 1. The file controller 2 connects the work stations 1 and the multi-drive controller 3. The input commands are transmitted to the multi-drive controller 3 via the file controller 2. The multi-drive controller 3 controls a mechanism within the multi-drive section 4, and also controls data (information) reading and writing operation of the multi-drive section 4 in response to the input commands. The multi-drive controller 3 outputs read-out data to the file controller 2. Then, the read-out data is transmitted to the work stations 2, being indicated and processed in the work stations 1.

The multi-drive section 4 includes a plurality of data (information) recording disks 5, a carrier mechanism 6, and two disk drives (decks) 7. The disks 5 are normally contained in a disk rack or a disk holder. The carrier mechanism 6 selects one of the disks 5 and carries the selected disk 5 from the disk rack to one of the disk drives 7 in response to a control signal fed from the multi-drive controller 3. Under conditions where a disk 5 is set in a disk drive 7, the disk drive 7 can read out and write information from and into the disk 5 in response to a control signal fed from the multi-drive controller 3. While one of the disk drives 7 is executing data (information) reading and writing processes on a first disk, a second disk can be moved by the carrier mechanism 6 to the other disk drive 7 to shorten an access time. After an information reading process or an information writing process is completed, the carrier mechanism 6 can return a disk 5 to the disk rack in response to a control signal fed from the multi-drive controller 3.

A description will now be given of operation of the prior art electronic file system of FIG. 1 which occurs under exemplary conditions. With reference to FIG. 2, data (information) reading commands A-1, B-1, and C-1 are sequentially transmitted from the work stations WS-A, WS-B, and WS-C to the file controller 2 respectively. The data reading command A-1 is immediately transferred from the file controller 2 to the multi-drive controller 3, while the data reading commands B-1 and C-1 are held in the filer controller 2. The multi-drive controller 3 controls the multi-drive section 4 in response to the command A-1. Specifically, the multi-drive controller 3 activates the carrier mechanism 6, replacing the current disk 5 by a desired new disk 5 in a first disk drive 7. Then, the multi-drive controller 3 activates the first disk drive 7, reading out data from the desired disk 5 in compliance with the command A-1. In this way, the command A-1 is executed. The read-out data required by the command A-1 is returned from the multi-drive controller 3 to the work station WS-A via the file controller 2 as a response to the command A-1. When the work station WS-A retrieves the response to the command A-1, the work station WS-A transmits a subsequent data reading command A-2 to the file controller 2. Next, the data reading command B-1 is transferred from the file controller 2 to the multi-drive controller 3. The multi-drive controller 3 controls the multi-drive section 4 in response to the command B-1. Specifically, the multi-drive controller 3 activates the carrier mechanism 6, replacing the current disk 5 by a desired new disk 5 in a second disk drive 7. Then, the multi-drive controller 3 activities the second disk drive 7, reading out data from the desired disk 5 in compliance with the command B-1. In this way, the command B-1 is executed. The read-out data required by the command B-1 is returned from the multi-drive controller 3 to the work station WS-B via the file controller 2 as a response to the command B-1. When the work station WS-B receives the response to the command B-1, the work station WS-B transmits a subsequent data reading command B-2 to the file controller 2. Next, the data reading command C-1 is transferred from the file controller 2 to the multi-drive controller 3. The multi-drive controller 3 controls the multi-drive section 4 in response to the command C-1. It is now assumed that data required by the command C-1 is contained in neither the current disk 5 in the first disk drive 7 nor the current disk 5 in the second disk drive 7. Thus, the multi-drive controller 3 activates the carrier mechanism 6, replacing the current disk 5 by a desired new disk 5 in the first disk drive 7. Then, the multi-drive controller 3 activates the first disk drive 7, reading out data from the desired disk 5 in compliance with the command C-1. In this way, the command C-1 is executed. The read-out data required by the command C-1 is returned from the multi-drive controller 3 to the work station WS-C via the file controller 2 as a response to the command C-1. When the work station WS-C receives the response to the command C-1, the work station WS-C transmits a subsequent data reading command C2 to the file controller 2. During a later period, similar processes are sequentially executed for the subsequent data reading commands A-2, B-2, and C-2.

Each of the commands A-1, B-1, C-1, ... requires reading out an amount of data (information) which corresponds to one page of predetermined-size documents. FIG. 3 is a timing chart showing conditions of the data reading operation related to FIG. 2. In FIG. 3, the abscissa denotes an elapsed time (second), and the ordinate denotes a page number. In FIG. 3, numerals written below the boxes containing the command-denoting characters represent elapsed time sup to the moments of the completion of the data reading processes. As shown in FIG. 3, the commands from the work stations are sequentially executed at equal time pitches of 18 seconds. The disk replacement in the disk drives 7 require such long pitches.

In usual cases, a group of the commands A-1, A-2, ... from the work station WS-A, a group of the commands B-1, B-2, ... from the work station WS-B, and a group of the commands C-1, C-2, ... from the work station WS-C relate to different disks 5 respectively. Since the number of the disk drives 7 is two, only two of the disks 5 can be simultaneously exposed to the data reading process. Each disk replacement in the disk drives 7 spends a certain time. The disk replacement includes the transfer of a disk 5 between the disk rack and a disk drive 7 by the carrier mechanism 6. Accordingly, in the case where commands from the work stations 1 are sequentially executed as mentioned previously, when the frequency of access to different disks 5 increases, the execution of the commands tends to be interrupted by the disk replacement and the transfer of the disks 5.

DISCLOSURE OF THE INVENTION

It is an object of this invention to provide an improved electronic file system.

In a first aspect of this invention provides an electronic file system comprising a recording medium; a plurality of terminal devices; a memory; predictive pre-read means for predicting data which will be required by one of the terminal devices next, and for pre-reading the predicted data from the recording medium and storing the pre-read data into the memory; counter means for calculating a store time of each data in the memory for each of the terminal devices; and pre-read control means for controlling the predictive pre-read means to pre-read data, required by one of the terminal devices which relates to a smallest sum of the store times calculated by the counter means, from the recording medium.

In a second aspect of this invention provides an electronic file system comprising a recording medium; a plurality of terminal devices; a memory; predictive pre-read means for predicting data which will be required by one of the terminal devices next, and for pre-reading the predicted data from the recording medium and storing the pre-read data into the memory; counter means for calculating a store time of each data in the memory for each of the terminal devices; pre-read control means for controlling the predictive pre-read means to pre-read data, required by one of the terminal devices which relates to a smallest sum of the store times calculated by the counter means, from the recording medium; and memory control means for, in cases where the memory is fully occupied, removing data, required by one of the terminal devices which relates to a greatest sum of the store times calculated by the counter means, from the memory.

In a third aspect of this invention provides an electronic file system comprising a recording medium; a plurality of terminal devices; a memory; predictive pre-read means for predicting data which will be required by one of the terminal devices next, and for pre-reading the predicted data from the recording medium and storing the pre-read data into the memory; and management means for providing page management tables in the memory for the terminal devices respectively and providing a surplus management table in the memory, for managing data in the memory in accordance with the page management tables and the surplus management tables, for managing a given amount of pages on the basis of weights of the pages by use of one of the page management tables for each of the terminal devices, and for, in cases where a page overflows the given amount, managing the overflow page by use of the surplus management table.

BRIEF DESCRIPTION OF THE DRAWINGS

FIGS. 39(a) and 3(b) are diagram showing conditions of page management using a weighting process in the system of FIG. 37.

DESCRIPTION OF THE FIRST PREFERRED EMBODIMENT

Figure 4:
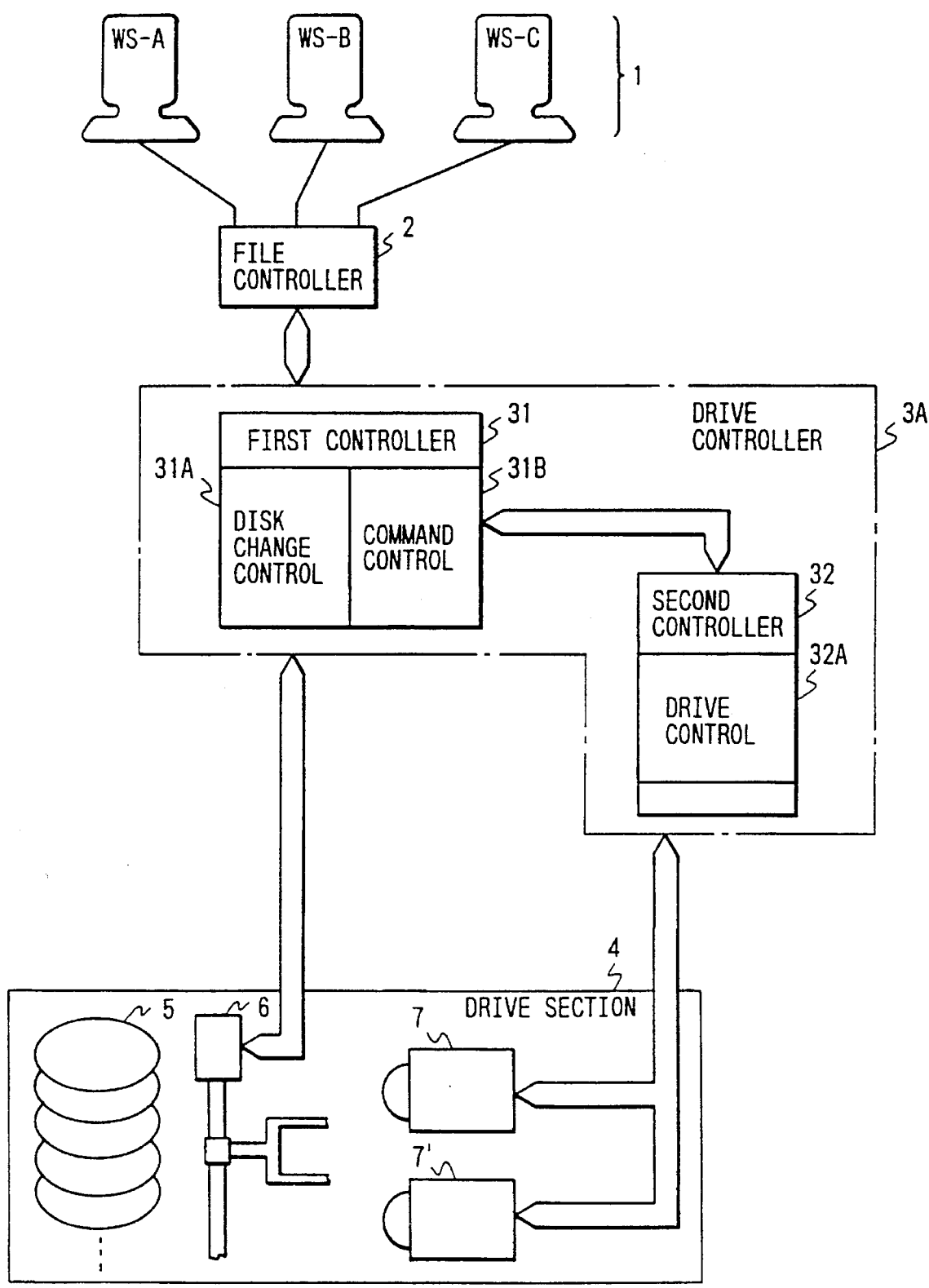
FIG. 4 is a block diagram of an electronic file system according to a first embodiment of this invention.

With reference to FIG. 4, an electronic file system of the multi-disk-drive type includes a plurality of work stations 1 (WS-A, WS-B, and WS-C), a file controller 2, a multi-drive controller 3A, and a multi-drive section 4.

Various commands can be inputted via the work stations 1. The file controller 2 constitutes an interface which connects the work stations 1 and the multi-drive controller 3A. The input commands are transmitted to the multi-drive controller 3A via the file controller 2. The multi-drive controller 3A controls a mechanism within the multi-drive section 4, and also controls data (information) reading and writing operation of the multi-drive section 4 in response to the input commands. The multi-drive controller 3A outputs read-out data to the file controller 2. Then, the read-out data is transmitted to the work stations 1, being indicated and processed in the work stations 1.

The multi-drive controller 3A has a first controller 31 and a second controller 32. The first controller 31 includes a disk change controller 31A and a command controller 31B. The second controller 32 includes a disk-drive controller 32A.

The multi-drive section 4 includes a plurality of data (information) recording disks 5, a carrier mechanism 6, and two disk drives (decks) 7, 7'. The disks 5 are normally contained in a disk rack or a disk holder. The carrier mechanism 6 selects one of the disks 5 and carries the selected disk 5 from the disk rack to one of the disk drives 7 in response to a control signal fed from the disk change controller 31A of the multi-drive controller 3A. Under conditions where a disk 5 is set in a disk drive 7, the disk drive 7 can read out and write data (information) from and into the disk 5 in response to a control signal fed from the disk-drive controller 32A of the multi-drive controller 3A. The carrier mechanism 6 returns the disk 5 from one of the disk drives 7 to the disk rack in response to a control signal fed from the disk change controller 31A. Thus, the carrier mechanism 6 replaces a disk 5 in one of the disk drives 7 in response to a control signal fed from the disk change controller 31A.

Figure 5:
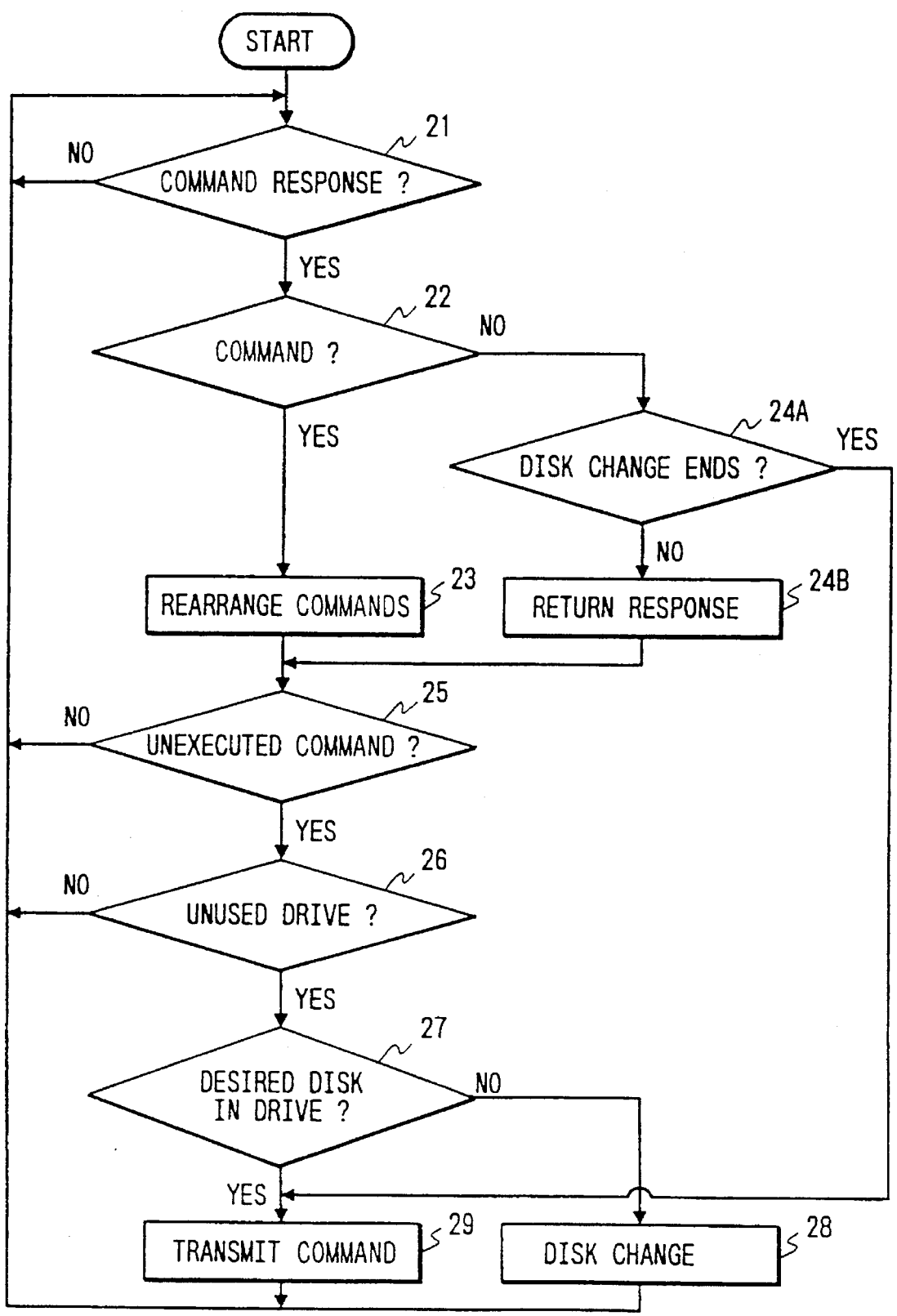
FIG. 5 is a flowchart of a program operating the multi-drive controller of FIG. 4.

The multi-drive controller gA. Includes a combination of a processing section, a ROM, a RAM, and an input/output section. The multi-drive controller 3A operates In accordance with a program stored in the ROM. FIG. 5 is a flowchart of the program.

As shown in FIG. 5, a first step 21 of the program decides whether or not a command Is received from the work stations 1. In addition, the step 21 decides whether or not a response is received from the multi-drive section 4. When neither a command nor a response is received, the step 21 is reiterated. When a command or a response is received, the program advances to a step 22.

The step 22 decides which of a command and a response is received. When a command is received, the program advances to a step 23. When a response is received, the program advances to a step 24A.

The step 23 rearranges the currently received command and previously received and unexecuted commands into an order which can reduce the number of times of the replacement of the disks 5. For this purpose, the step 23 stores the currently received command into the RAM. After the step 23, the program advances to a step 25.

The step 24A detects whether or not disk replacement is completed. When the disk replacement is completed, the program jumps to a step 29. Otherwise, the program advances to a step 24B.

The step 24B transfers a response to the file controller 1 so that the response will be returned to one of the work stations 1. After the step 24B, the program advances to the step 25.

The step 25 decides whether or not an unexecuted command is present. When an unexecuted command is present, the program advances to a step 26. When an unexecuted command is absent, the program returns to the step 21.

The step 26 detects whether or not an unoccupied disk drive 7 is present. When an unoccupied disk drive is present, the program advances to a step 27. Otherwise, the program returns to the step 21.

The step 27 decides whether or not a desired disk 5 required by the unexecuted command is set in one of the disk drives 7. When the desired disk 5 is not set in one of the disk drives 7, the program advances to a step 28. When the desired disk 5 is set in one of the disk drives 7, the program advances to the step 29.

The step 28 controls the carrier mechanism 6 so that the current disk in one of the disk drives 7 will be replaced by a new disk which relates to the unexecuted command. During an initial stage, the step 28 control the carrier mechanism 6 so that a disk which relates to the unexecuted command will be selected and transferred from the disk rack to one of the drive drives 7. After the step 28, the program returns to the step 21.

The step 29 outputs the command to the related disk drive 7 so that the command will be executed. After the step 29, the program returns to the step 21.

Figure 6:
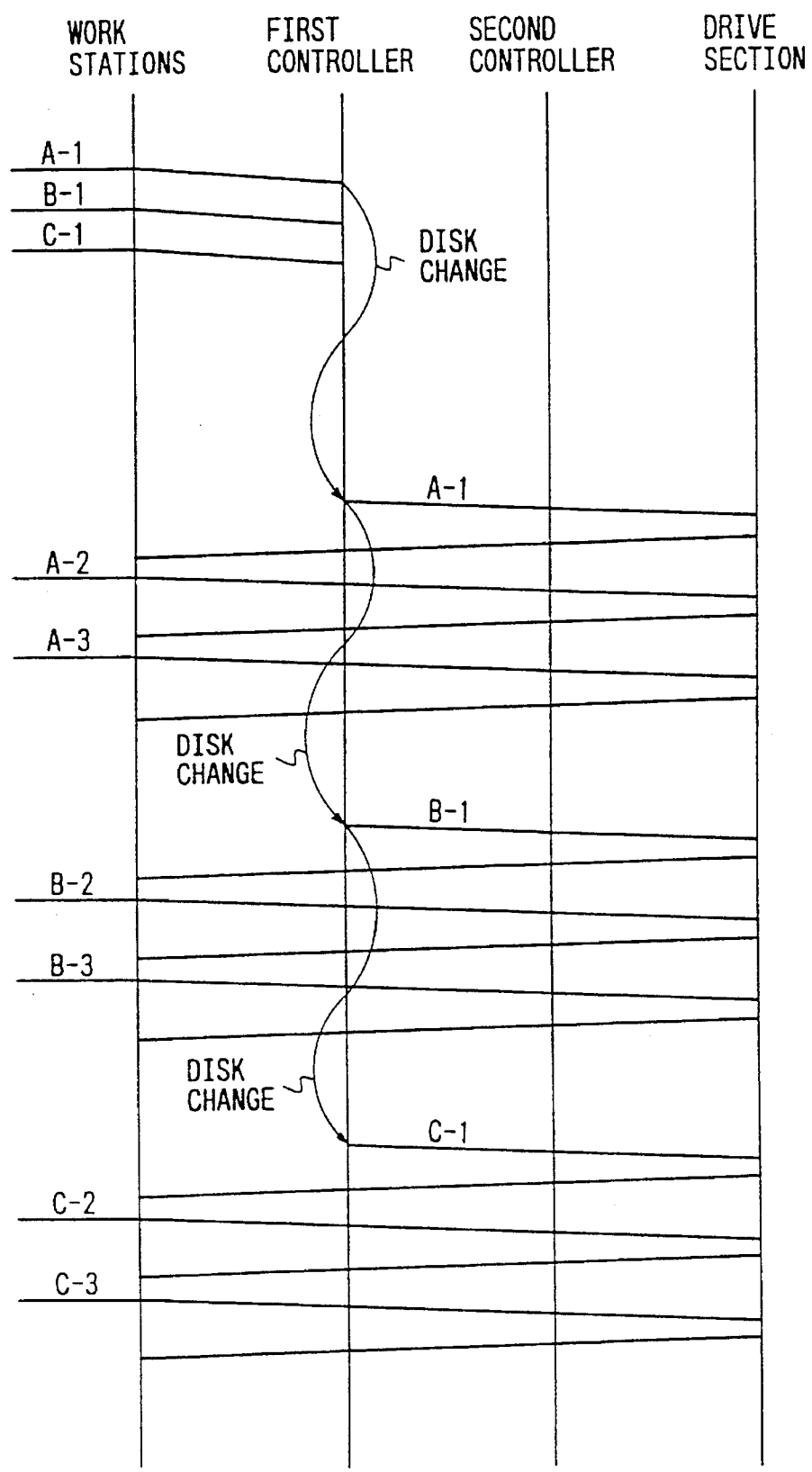
FIG. 6 is a diagram showing a sequence of commands and responses in the system of FIG. 4.

According to the program of FIG. 5, the multi-drive controller 3A operates as follows. It is now assumed that, as shown in FIG. 6, data reading commands A-1, B-1, and C-1 are sequentially inputted into the first controller 31 in the multi-drive controller 3A from the work stations WS-A, WS-B, and WS-C via the file controller 2 respectively. Firstly, the first controller 31 activates the carrier mechanism 6 in response to the command A-1 so that the current disk in a first disk drive 7 will be replaced by a desired new disk required by the command A-1. This process is executed by the step 28 of FIG. 5. The commands B-1 and B-2 are held in the first controller 31. The command A-1 is held in the first controller 31 until the disk replacement is completed. When the disk replacement is completed, the command A-1 is transferred from the first controller 31 to the multi-disk section 4 via the second controller 32 in the multi-drive controller 3A. In addition, since the input command B-1 from the work station WS-B is present, the first controller 31 subsequently activates the carrier mechanism 6 in response to the command B-1 so that the current disk in a second disk drive 7 will be replaced by a desired new disk required by the command B-1. This process is also executed by the step 28 of FIG. 5. In the multi-disk section 4, the first disk drive 7 reads out data from the disk 5 in compliance with the command A-1. The read-out data is quickly transmitted from the first disk drive 7 to the work station WS-A via the multi-drive controller 3A and the file controller 2 as a response to the command A-1. When the work station WS-A receives the response to the command A-1, the work station WS-A transmits a subsequent command A-2 to the first controller 31 via the file controller 2. The first controller 31 rearranges the unexecuted commands B-1, C-1, and A-2 into the order as A-2, B-1, and C-1. This process is executed by the step 23 of FIG. 5. Then, the command A-2 is transferred from the first controller 31 to the multi-disk section 4 via the second controller 32. In the multi-disk section 4, the first disk drive 7 reads out data from the disk 5 in compliance with the command A-2. The read-out data is quickly transmitted from the first disk drive 7 to the work station WS-A via the multi-drive controller 3A and the file controller 2 as a response to the command A-2. When the work station WS-A receives the response to the command A-2, the work station WS-A transmits a subsequent command A-3 to the first controller 31 via the file controller 2. The first controller 31 rearranges the unexecuted commands B-1, C-1, and A-3 into the order as A-3, B-1, and C-1. This process is executed by the step 23 of FIG. 5. Then, the command A-3 is transferred from the first controller 31 to the multi-disk section 4 via the second controller 32. In the multi-disk section 4, the first disk drive 7 reads out data from the disk 5 in compliance with the command A-3. The read-out data is quickly transmitted from the first disk drive 7 to the work station WS-A via the multi-drive controller 3A and the file controller 2 as a response to the command A-3. The previously-mentioned data reading processes related to the commands A-1, A-2, and A-3 are executed during the disk replacement in the second disk drive 7 which is required by the command B-1.

When the disk replacement in the second disk drive 7' is completed, the command B-1 is transferred from the first controller 31 to the multi-disk section 4 via the second controller 32. In addition, since there is the input command C-1 from the work station WS-C which generally requires a new disk different from the current disks in the first and second disk drives 7, the first controller 31 subsequently activates the carrier mechanism 6 in response to the command C-1 so that the current disk in the first disk drive 7 will be replaced by a desired new disk required by the command C-1. This process is executed by the step 28 of FIG. 5. In the multi-disk section 4, the second disk drive 7' reads out data from the disk 5 in compliance with the command B-1. The read-out data is quickly transmitted from the first disk drive 7 to the work station WS-B via the multi-drive controller 3A and the file controller 2 as a response to the command B-1. When the work station WS-B receives the response to the command B-1, the work station WS-B transmits a subsequent command B-2 to the first controller 31 via the file controller 2. The first controller 31 rearranges the unexecuted commands C-1 and B-2 into the order as B-2 and C-1. This process is executed by the step 23 of FIG. 5. Then, the command B-2 is transferred from the first controller 31 to the multi-disk section 4 via the second controller 39. In the multi-disk section 4, the second disk drive 7' reads out data from the disk 5 in compliance with the command B-2. The read-out data is quickly transmitted from the first disk drive 7 to the work station WS-B via the multi-drive controller 3A and the file controller 2 as a response to the command B-2. When the work station WS-B receives the response to the command B-2, the work station WS-B transmits a subsequent command B-3 to the first controller 31 via the file controller 2. The first controller 31 rearranges the unexecuted commands C-1 and B-3 into the order as B-3 and C-1. This process is executed by the step 23 of FIG. 5. Then, the command B-3 is transferred from the first controller 31 to the 15 multi-disk section 4 via the second controller 32. In the multi-disk section 4, the second disk drive 7' reads out data from the disk 5 in compliance with the command B-3. The read-out data is quickly transmitted from the first disk drive 7 to the work station WS-B via the multi-drive controller 3A and the file controller 2 as a response to the command B-3. The previously-mentioned data reading processes related to the commands B-1, B-2, and B-3 are executed during the disk replacement in the first disk drive 7 which is required by the command C-1. The command C-1 and subsequent commands C-2 and C-3 are executed in a way similar to the way of the execution of the commands A-1, A-2, A-3, B-1, B-2, and B-3.

Figure 1:
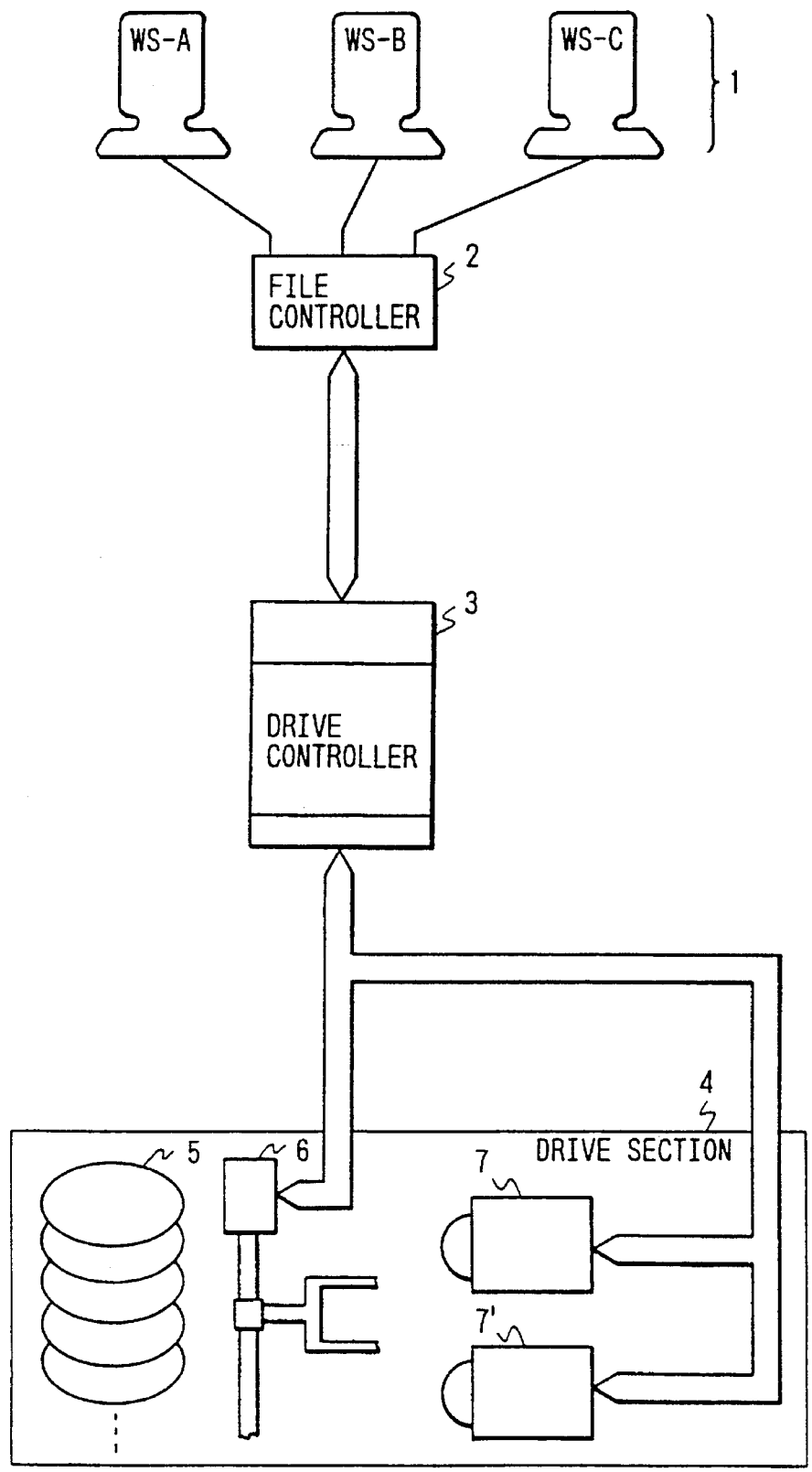
FIG. 1 is a block diagram of a prior art electronic file system.
Figure 2:
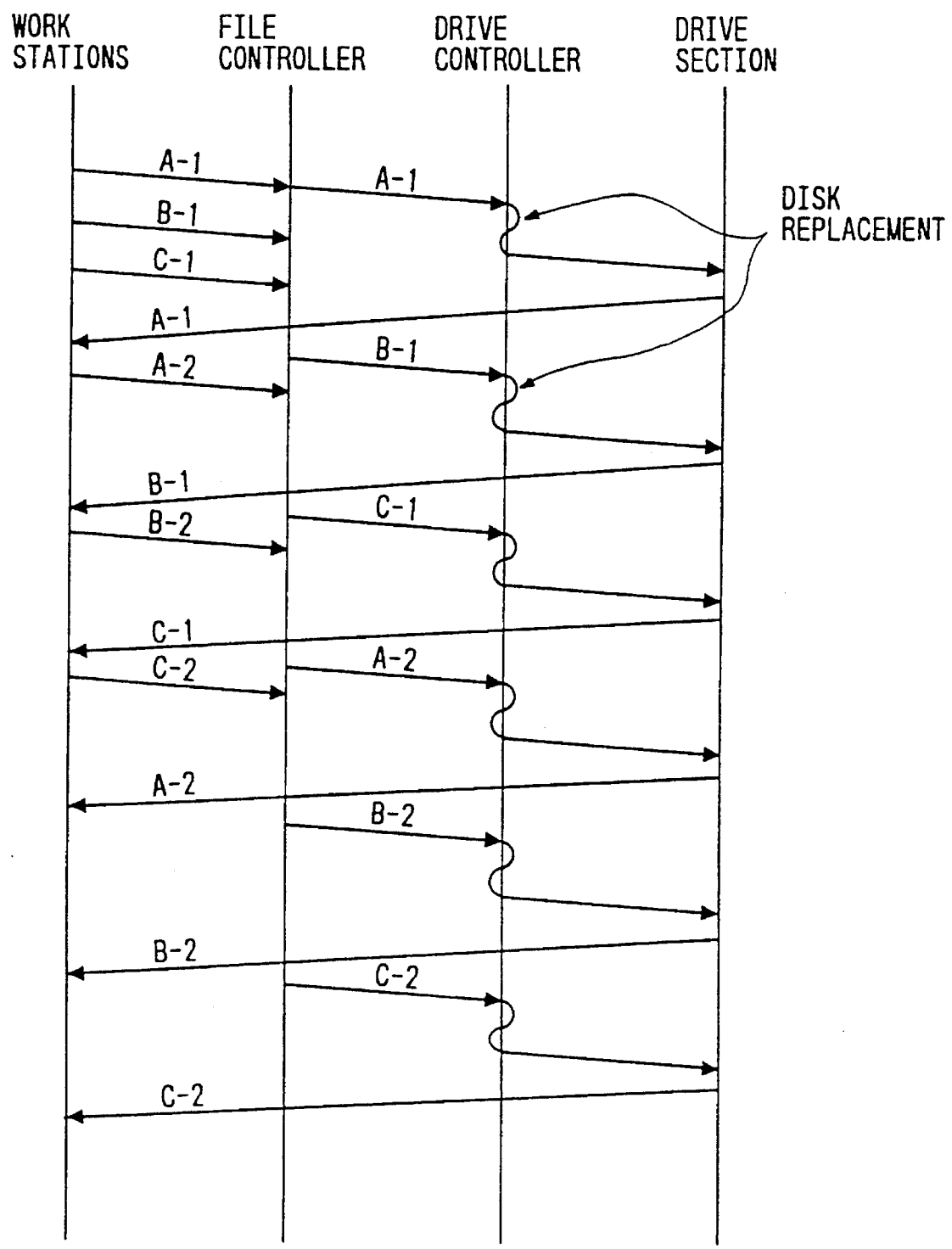
FIG. 2 is a diagram showing a sequence of commands and responses in prior art system of FIG. 1.
Figure 3:
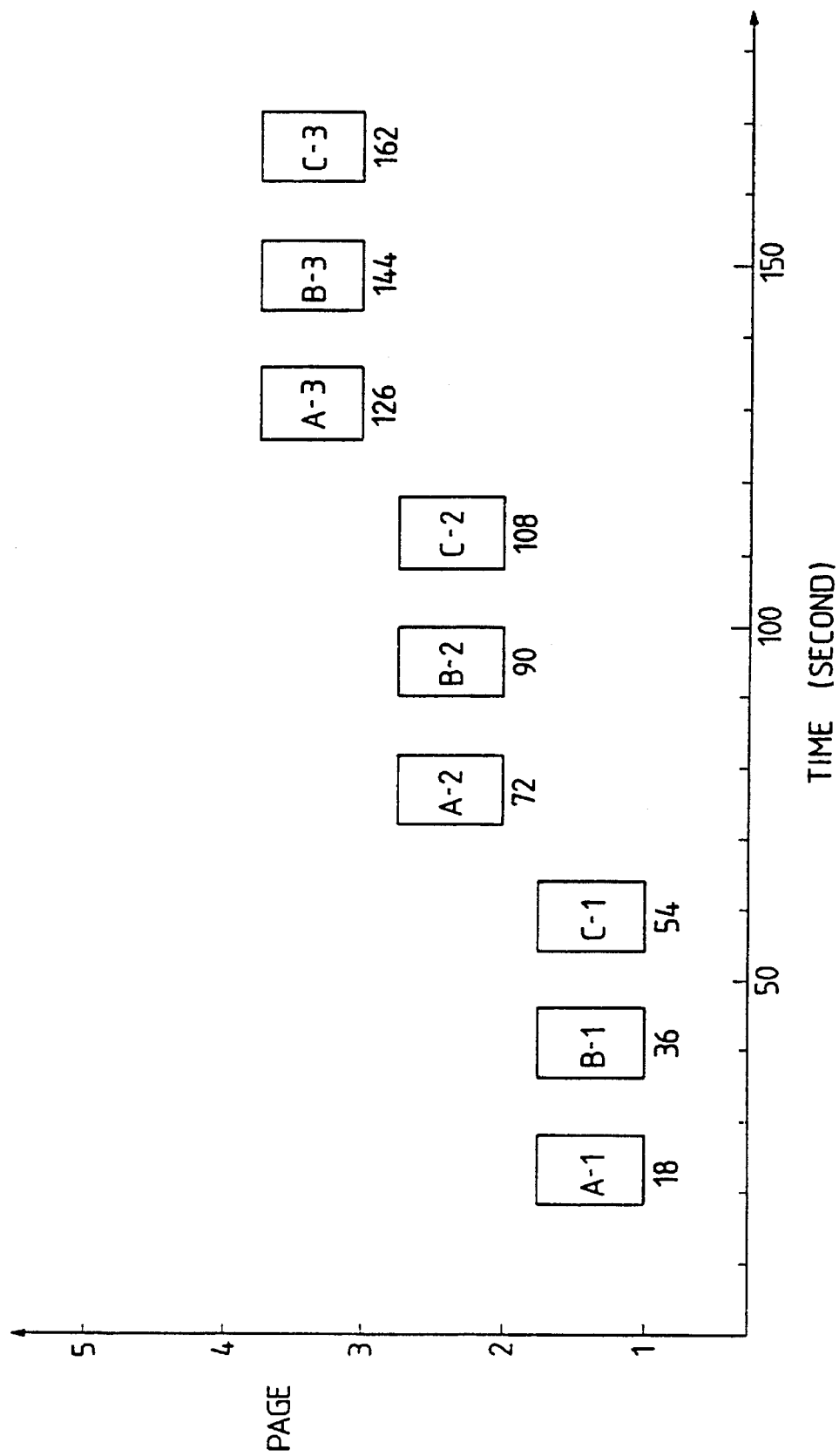
FIG. 3 is a time-domain diagram showing timings of execution of commands in the prior art system of FIG. 1.
Figure 7:
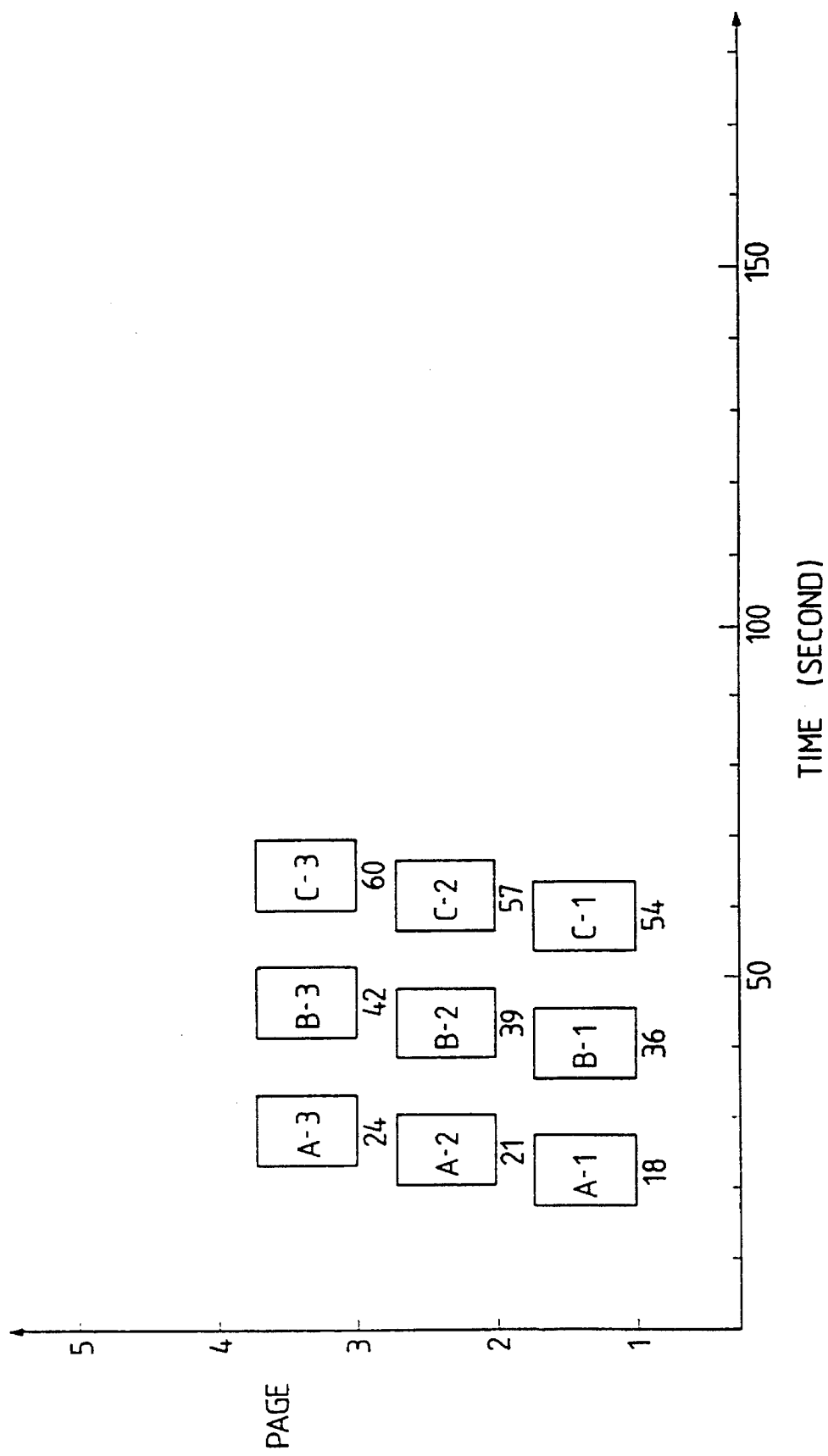
FIG. 7 is a time-domain diagram showing timings of execution of commands in the system of FIG. 4.

Each of the commands A-1, B-1, C-1, . . . requires reading out an amount of information which corresponds to one page of predetermined-size documents. FIG. 7 is a timing chart showing conditions of the data reading operation related to FIG. 6. In FIG. 7, the abscissa denotes an elapsed time (second), and the ordinate denotes a page number. In FIG. 7, numerals written below the boxes containing the command-denoting characters represent elapsed times up to the moments of the completion of the data reading processes. As shown in FIG. 7, the execution of the commands A-1, A-2, A-3, . . . , C-1, C-2, and C-3 is completed in 60 seconds much shorter than the corresponding time of FIG. 3. The shorter time results from the rearrangement of the commands by the step 23 of FIG. 5 which reduces the number of times of the disk replacements in the multi-drive section 4.

DESCRIPTION OF THE SECOND PREFERRED EMBODIMENT

Figure 8:
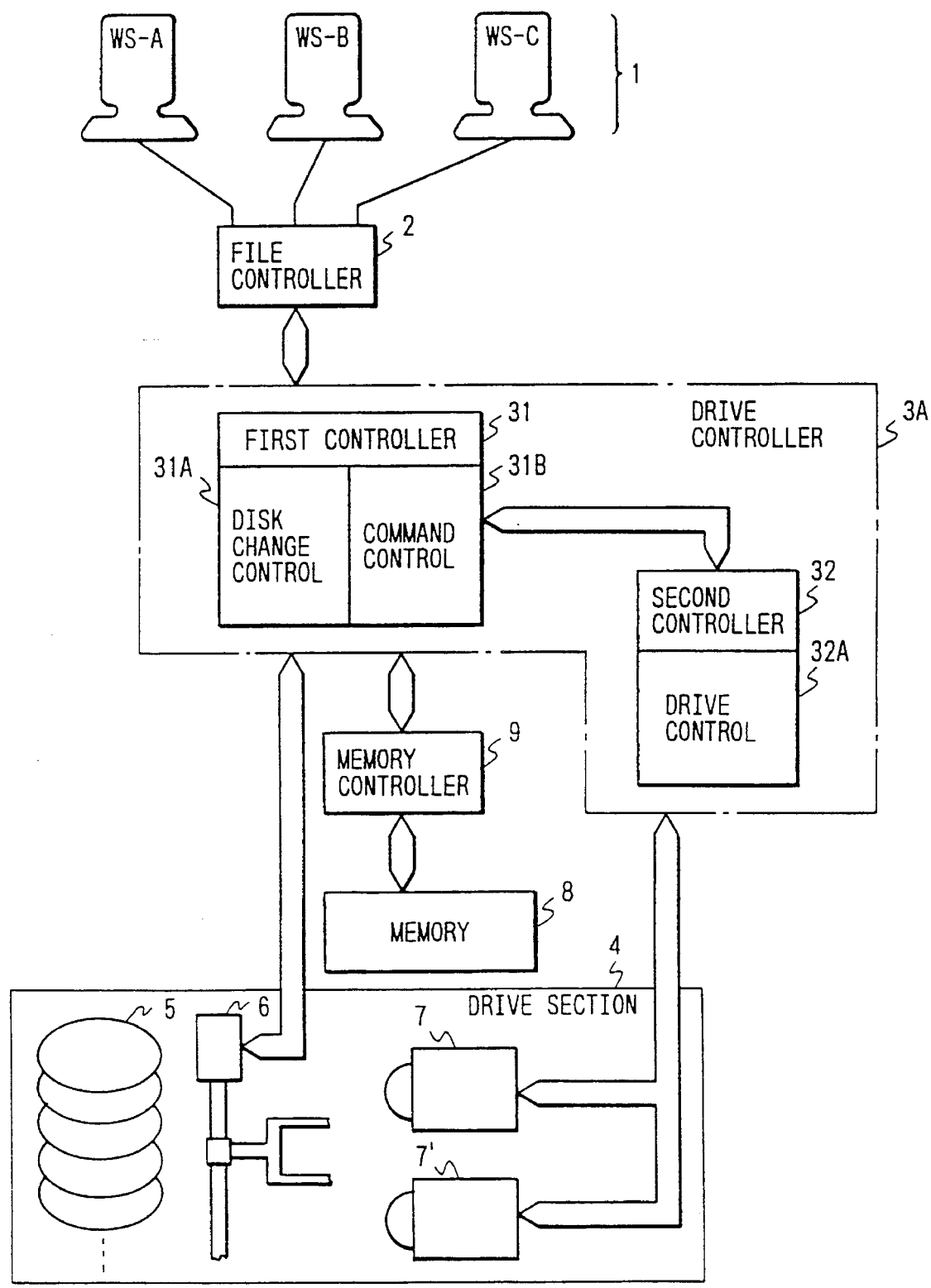
FIG. 8 is a block diagram of an electronic file system according to a second embodiment of this invention.

FIG. 8 shows a second embodiment of this invention which is similar to the embodiment of FIGS. 4–7 except that a memory 8 and a memory controller 9 are added. The memory controller 9 is connected between a multi-drive controller 3A and the memory 8. The memory controller 9 serves to control the memory 8. The memory 8 serves to store pre-read (pre-fetched) data before the execution of commands. The memory 8 can be used by work stations 1.

According to a prior art design, as the number of terminals in one of work stations increases, the work station requires a larger area within a memory so that the memory can not be used equally by the work stations.

In order to resolve this problem of the prior art design, the memory controller 9 operates to enable the memory 8 to be used equally by the work stations 1. Specifically, the memory controller 9 reduces an excessively great area within the memory 8 which is used by a work station 1, and allots the reduction-corresponding area to another work station 1 which needs some area within the memory 8. The equal use of the memory 8 by the work stations 1 enables quick access to disks 5.

The capacity of the memory 8 is chosen so that the memory 8 can store an amount of data (information) which corresponds to 30 pages of predetermined-size documents. Each of the work stations 1 is permitted to use an area within the memory 8, the maximum of which corresponds to 20 pages of predetermined-size documents.

Figure 9:
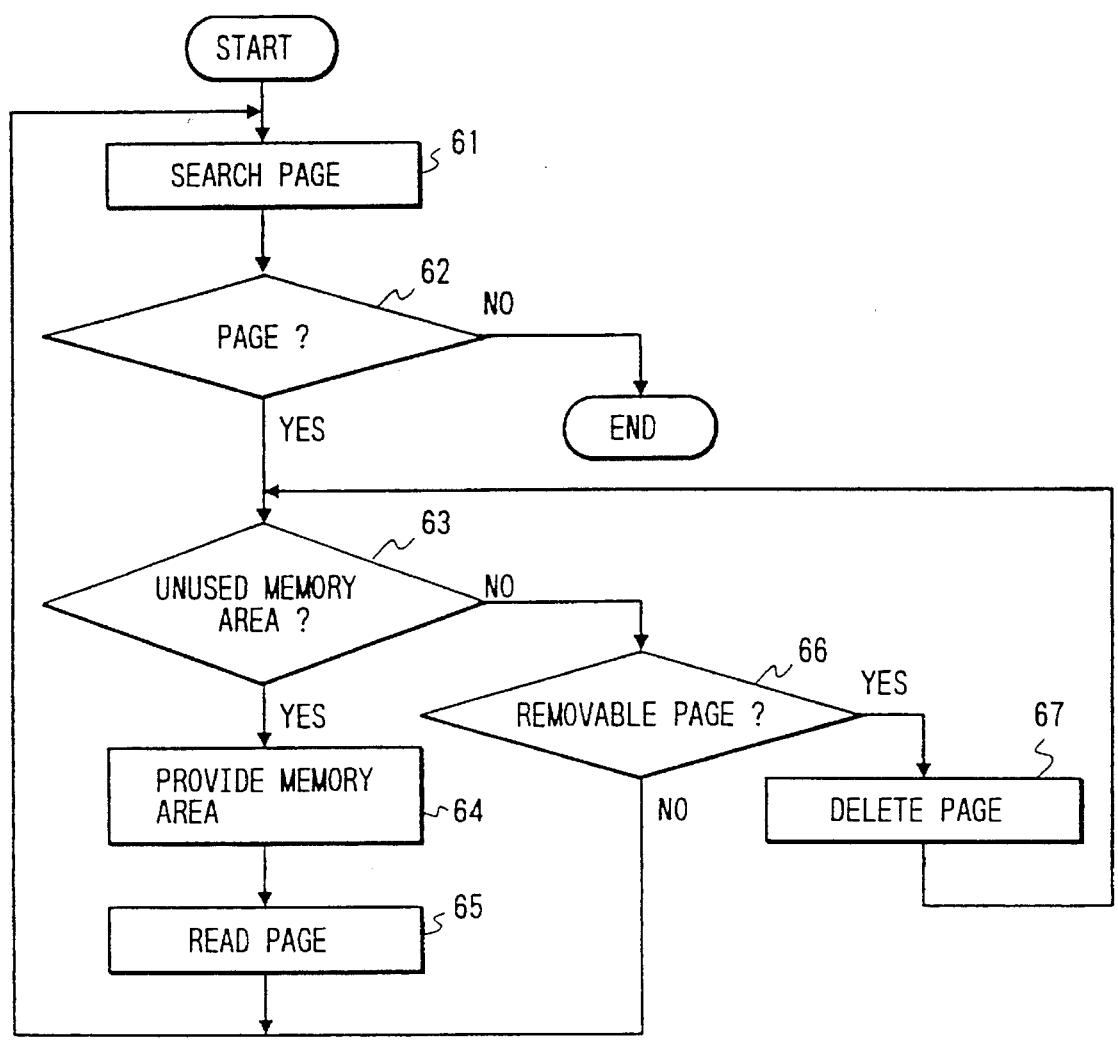
FIG. 9 is a flowchart of a program operating the memory controller of FIG. 8.

The memory controller 9 includes a combination of a processing section, a ROM, a RAM, and an interface. The memory controller 9 operates in accordance with a program stored in the ROM. FIG. 9 is a flowchart of the program. It should be noted that, in the following description related to FIG. 9, data (information) representing pages of documents are usually referred to as pages for an easy understanding.

As shown in FIG. 9, a first step 61 of the program searches a page which is required to be read out. A step 62 following the step 61 decides whether or not such a page is present. When such a page is present, the program advances to a step 63. Otherwise, the present execution cycle of the program is ended.

The step 63 checks whether or not a sufficient-size unoccupied area is present in the memory 8. When such an unoccupied area is present, the program advances to a step 64. When such an unoccupied area is absent, the program advances to a step 66.

The step 64 secures an area within the memory 8 which corresponds to 20 pages of predetermined-size documents. A step 65 following the step 64 reads out data representing the required 20 pages and stores the read-out data into the secured area within the memory 8. After the step 65, the program returns to the step 61.

The step 66 checks whether or not a page (pages) which can be deleted from the memory 8 is present. When such a page is present, the program advances to a step 67. When such a page is absent, the program returns to the step 61.

The step 67 deletes the designated page from the memory 8. After the step 67, the program returns to the step 63.

Figure 10A:
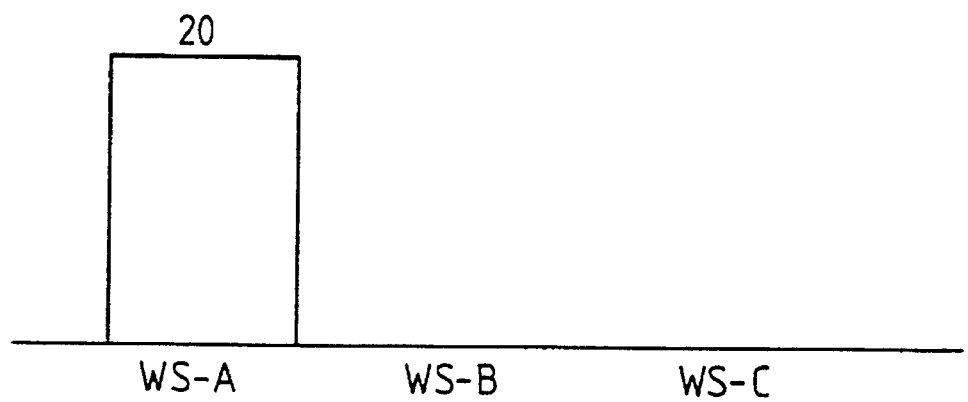
FIGS. 10(a), 10(b), and 10(c) are diagrams showing conditions of the allotment of pre-read memory areas in the system of FIG. 8.
Figure 10B:
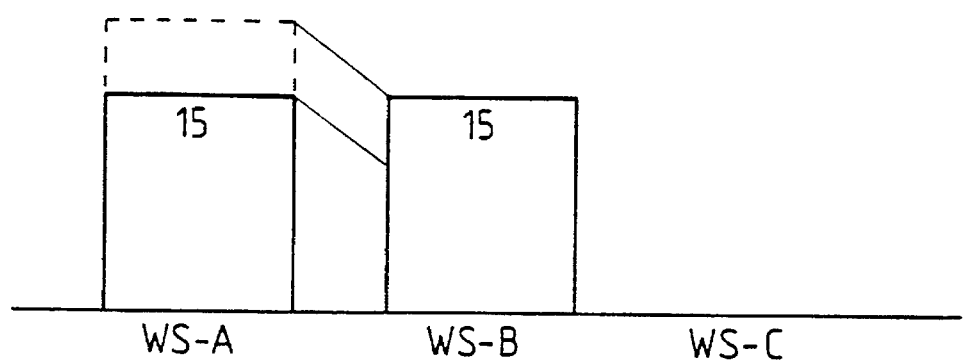
Figure 10C:
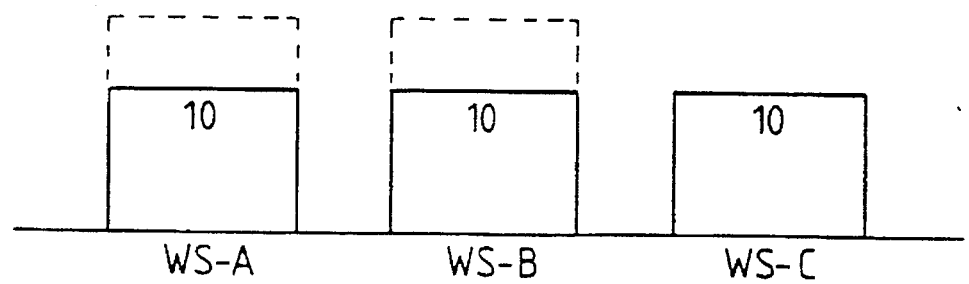

In cases where only the work station WS-A requires the use of the memory 8, an area within the memory 8 which corresponds to 20 pages is allotted to the work station WS-A as shown in FIG. 10(*a*). This process is executed by the step 64 of FIG. 9. When the work station WS-B also requires the use of the memory 8, the area within the memory 8 which is allotted to the work station WS-A is reduced to a size corresponding to 15 pages and then the remaining area of the memory 8 which corresponds to 15 pages is newly allotted to the work station WS-B as shown in FIG. 10(*b*). The reduction of the area within the memory 8 which is allotted to the work station WS-A is executed by the step 67 of FIG. 9. The allotment of the remaining area of the memory 8 to the work station WS-B is executed by the step 64. When the work station WS-C requires the use of the memory 8 in addition to the work stations WS-A and WS-B, both of the areas of the memory 8 which are allotted to the work stations WS-A and WS-B are reduced to a size corresponding to 10 pages and then the remaining area of the memory 8 which corresponds to 10 pages is newly allotted to the work station WS-C as shown in FIG. 10(*c*). The reduction of the areas within the memory 8 which are allotted to the work stations WS-A and WS-B is executed by the step 67 of FIG. 9. The allotment of the remaining area of the memory 8 to the work station WS-C is executed by the step 64.

DESCRIPTION OF THE THIRD PREFERRED EMBODIMENT

Figure 11:
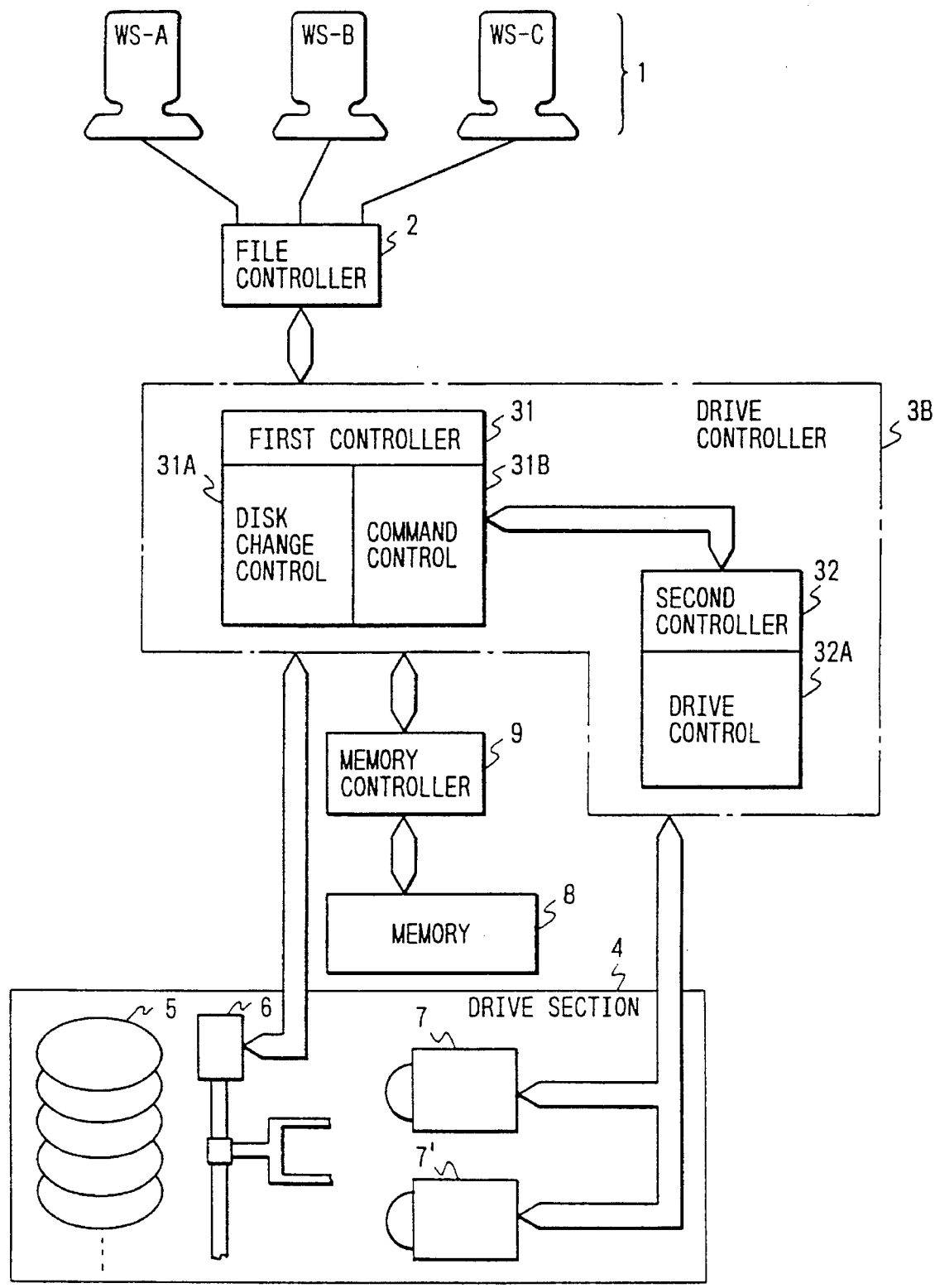
FIG. 11 is a block diagram of an electronic file system according to a third embodiment of this invention.
Figure 12:
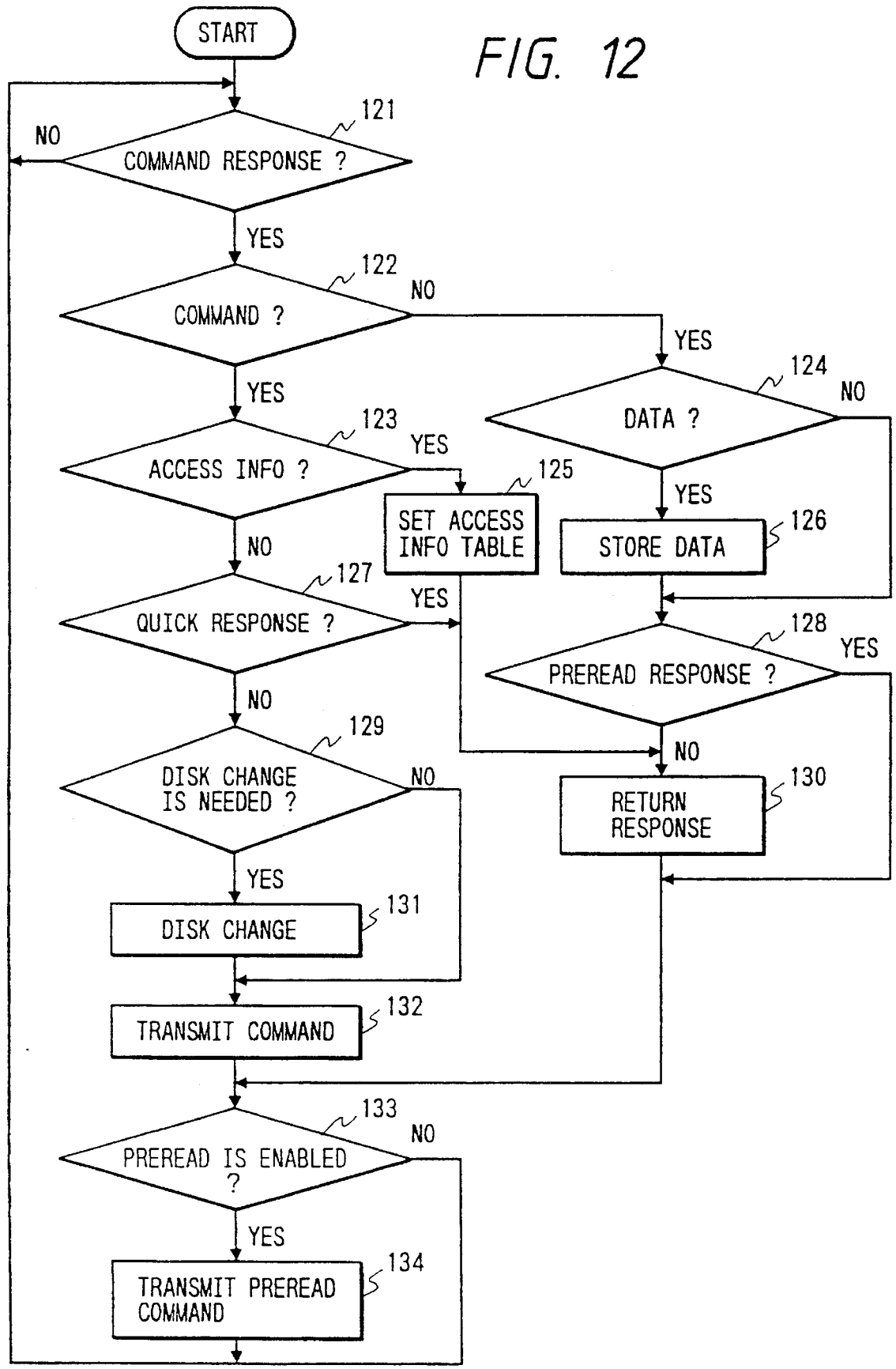
FIG. 12 is a flowchart of a program operating the multi-drive controller of FIG. 11.

FIG. 11 shows a third embodiment of this invention which is similar to the embodiment of FIGS. 8–10(*c*) except that the third embodiment includes a modified multi-drive controller 3B. The multi-drive controller 3B operates in accordance with a program. FIG. 12 is a flowchart of the program.

As shown in FIG. 12, a first step 121 of the program decides whether or not a command is received from work stations 1. In addition, the step 121 decides whether or not a response is received from a multi-drive section 4. When neither a command nor a response is received, the step 121 is reiterated. When a command or a response is received, the program advances to a step 122.

The step 122 decides which of a command and a response is received. When a command is received, the program advances to a step 123. When a response is received, the program advances to a step 124.

The step 124 checks whether or not the received response contains data. When the received response contains data, the program advances to a step 126 which stores the data into the memory 8. Otherwise, the program jumps to a step 128. After the step 126, the program also advances to the step 128.

The step 128 decides whether or not the data contained in the response agrees with pre-read (pre-fetched) data. When the data disagrees with the pre-read data, the program advances to a step 130 which transfers or returns the response to the work stations 1 via a file controller 2. Otherwise, the program jumps to a step 133 so that the response will not be immediately returned to the work stations 1. After the step 130, the program also advances to the step 133.

The step 123 checks whether or not the received command corresponds to access information. When the received command corresponds to the access information, the program advances to a step 125. Otherwise, the program advances to a step 127.

The step 125 sets a pre-read (pre-fetch) table. The pre-read table is generally provided in the memory 8. After the step 125, the program advances to the step 130.

In the case of a command other than access information, the step 127 is executed. The step 127 checks whether or not pre-reading (pre-fetching) data is done so that an immediate response is enabled. When the immediate response is enabled, the program advances to the step 130 to execute the return of the response. When the immediate response is not enabled, the program advances to a step 129.

The step 129 checks whether or not a currently selected disk 5 is required to be changed. When the currently selected disk 5 is required to be changed, the program advances to a step 131 which control the multi-drive section 4 to replace the currently selected disk by a new desired disk 5. Otherwise, the program jumps to a step 132. After the step 131, the program also advances to the step 132.

The step 132 transfers the command to the multi-drive section 4 to execute a data reading process. After the step 132, the program advances to a step 133.

The step 133 checks whether or not data which can be pre-read (pre-fetched) is present. When such data is absent, the program returns to the step 121. When such data is present, the program advances to a step 134 which transmits a pre-reading (pre-fetching) command to the multi-drive section 4. After the step 134, the program returns to the step 121.

Figures 13, 14:
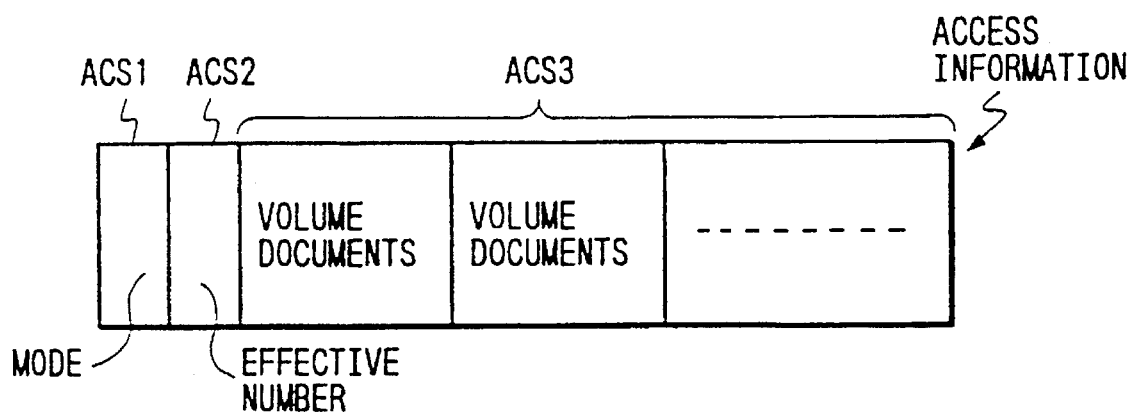
FIG. 13 is a diagram of an example of access information in the system of FIG. 11.
FIG. 14 is a diagram of an example of a pre-read table in the system of FIG. 11.

FIG. 13 shows an example of access information. As shown in FIG. 13, access information has segments ACS1, ACS2, and ACS3. The segments ACS1 represents one of a normal mode and a print mode. The segment ACS2 represents the effective number of different documents to be searched. The segment ACS3 represents a list of volumes and documents to be searched.

FIG. 14 shows an example of a pre-read table. The pre-read table is provided for each of the work stations 1. The pre-read table relates to cases where all documents in a list in access information can be read out without replacing a disk. The pre-read table has a structure in which pages are arranged in a pre-read order which is determined by a mode in access information of FIG. 13. During an actually pre-reading process, a look-up is started from the beginning of a pre-read table, and a pre-reading process is done on a page which agrees with a first-found un-preread page and which can be read out without replacing a disk.

Figure 15:
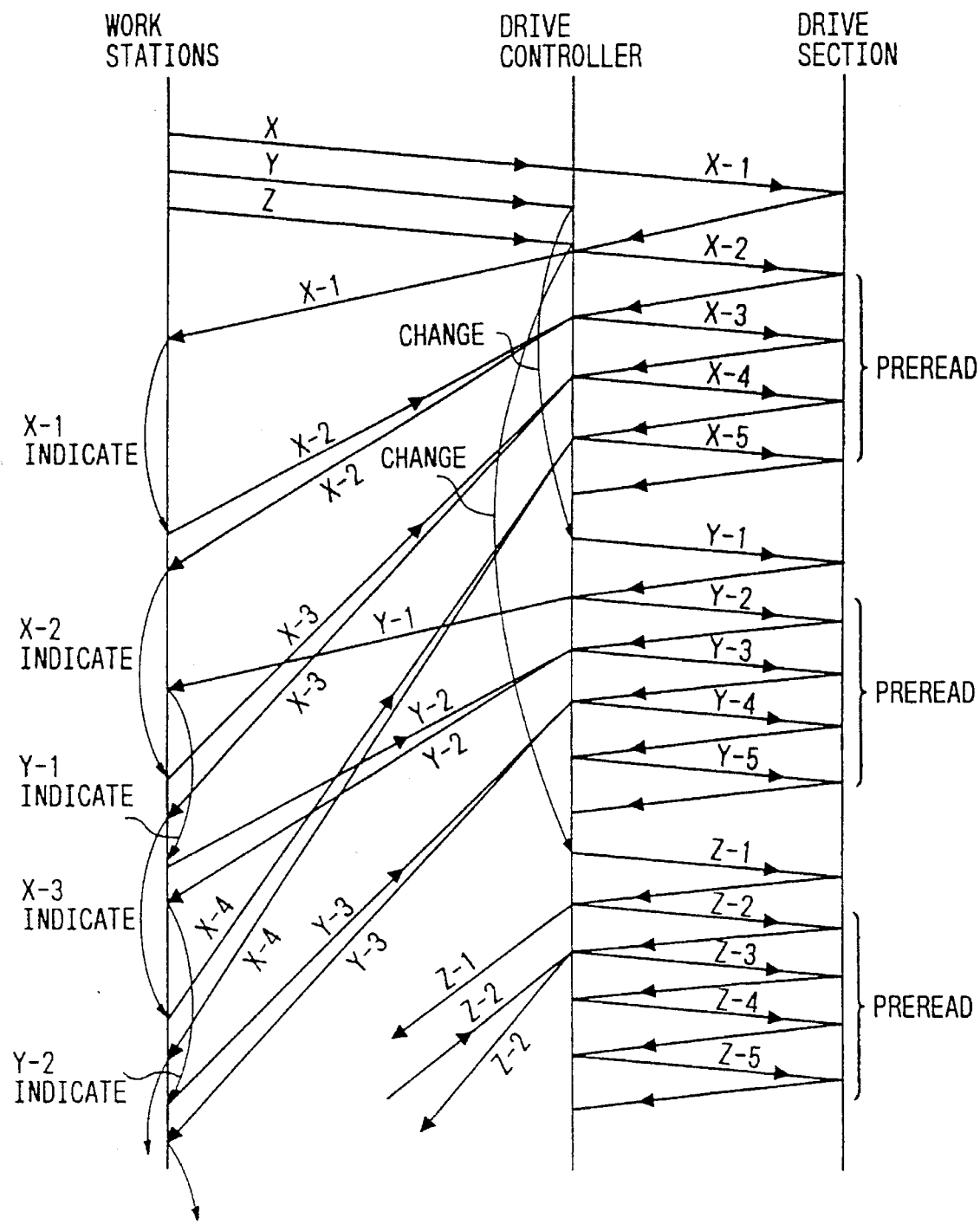
FIG. 15 is a diagram showing a pre-reading sequence of commands and responses in the system of FIG. 11.

The pre-reading process will be further described with reference to FIG. 15. It is now assumed that the work stations WS-A, WS-B, and WS-C require accesses to 5-page documents X, Y, and Z respectively, and that a disk 5 containing the documents X is set in a disk drive 7 but disks containing the documents Y and Z are not yet set in a disk drive 7. When the work station WS-A requires access to the documents X, the multi-drive controller 3B reads out the first page X-1 of the documents X from the related disk 5 via the disk drive 7 and transmits the read-out page X-1 to the work station WS-A. The work station WS-A indicates the read-out page X-1 on a display and edits the read-out page X-1. During this process, the multi-drive controller 3B pre-reads the later pages X-2, X-3, X-4, and X-5 of the documents X from the related disk 5 via the disk drive 7 and stores the pre-read pages X-2, X-3, X-4, and X-5 into the memory 8 via the memory controller 9. When the work station WS-A requires the next page X-2, the multi-drive controller 3B reads out the page X-2 from the memory 8 via the memory controller 9 and transmits the page X-2 to the work station WS-A. Similar processes are done on the subsequent pages X-3, X-4, and X-5.

During the processing of the documents X, the disk 5 containing the documents Y is set in the other disk drive 7'. The multi-drive controller 3B reads out the first page Y-1 of the documents Y from the related disk 5 via the disk drive 7' and transmits the read-out page Y-1 to the work station WS-B. The work station WS-B indicates the read-out page Y-1 on a display and edits the read-out page Y-1. In addition, the multi-drive controller 3B pre-reads the later pages Y-2, Y-3, Y-4, and Y-5 of the documents Y from the related disk 5 via the disk drive 7 and stores the pre-read pages Y-2, Y-3, Y-4, and Y-5 into the memory 8 via the memory controller 9.

After storing the last page Y-5 of the documents Y into the memory 8 is completed, the disk 5 containing the documents X is removed from the disk drive 7 and the disk containing the documents Z is set in the disk drive 7 therefore. Then, the multi-drive controller 3B reads out the first page Z-1 of the documents Z from the related disk 5 via the disk drive 7 and transmits the read-out page Z-1 to the work station WS-C. The work station WS-C indicates the read-out page Z-1 on a display and edits the read-out page Z-1. In addition, the multi-drive controller 3B pre-reads the later pages Z-2, Z-3, Z-4, and Z-5 of the documents Z from the related disk 5 via the disk drive 7 and stores the pre-read pages Z-2, Z-3, Z-4, and Z-5 into the memory 8 via the memory controller 9.

Figure 16:
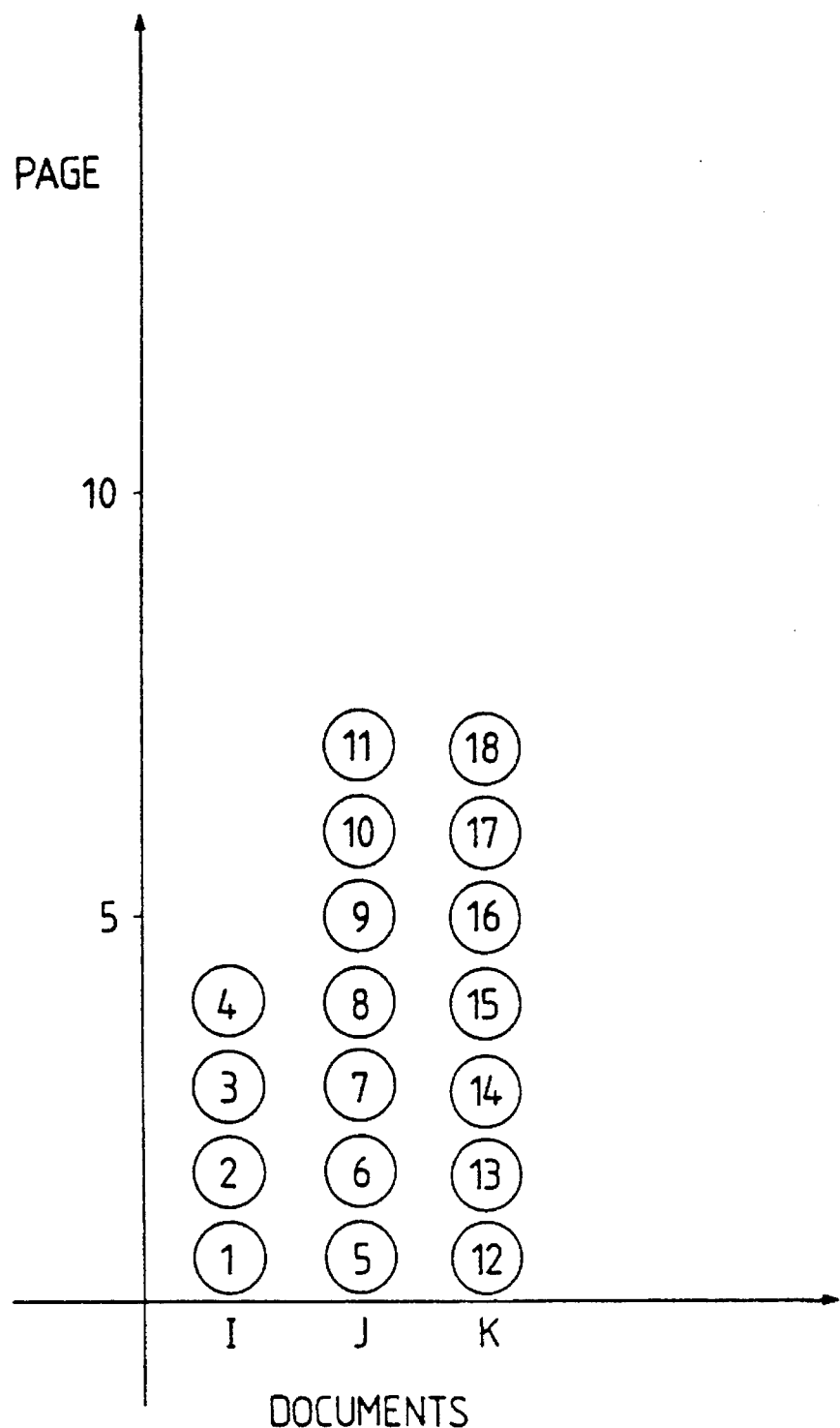
FIG. 16 is a diagram showing a normal order in which pages are read out in the system FIG. 11.

Other examples of the pre-reading process will be described with reference to FIGS. 16–18. FIG. 16 shows the order of pre-reading pages which occurs in the case where the multi-drive controller 3B receives access information from the work station WS-A, the access information requiring documents I, J, and K to be printed in the normal order. In FIG. 16, the numerals in circles denote the pre-read order numbers of the pages respectively. It is now assumed that a single command to a disk 5 enables reading out one page, that the documents I, J, and K have four pages, seven pages, and seven pages respectively, and that the documents I, J, and K are contained in a common disk 5. Firstly, the first page I-1 of the documents I is read out from the disk 5, and is transmitted to and printed in the work station. During the printing of the first page I-1, the later pages I-2, I-3, and I-4 of the documents I are sequentially pre-read. In addition, the pages J-1, J-2, . . . are sequentially pre-read. In this way, the pages are pre-read in the order which agrees with the order of the printing of the pages.

Figure 17:
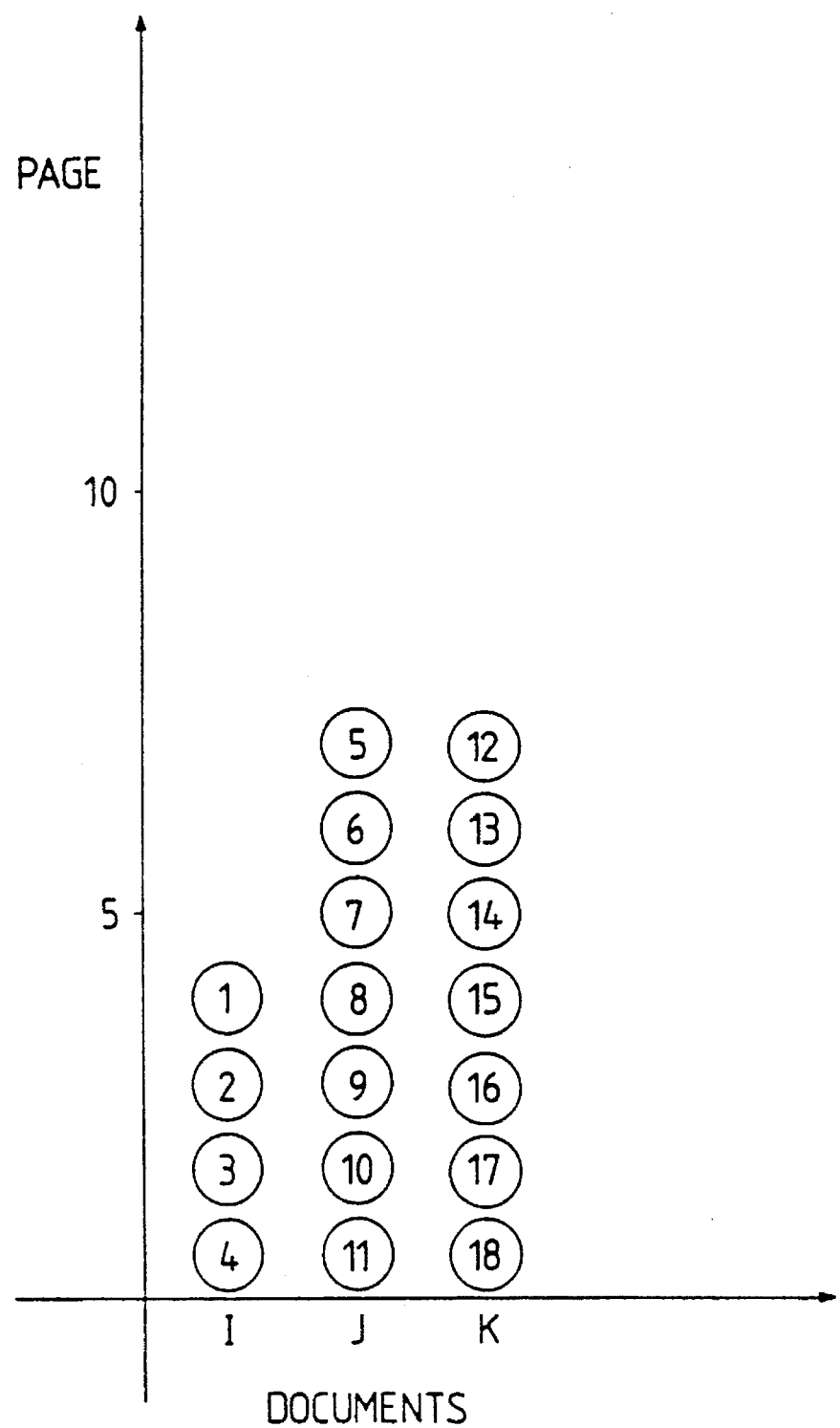
FIG. 17 is a diagram showing a reverse order in which pages are read out in the system of FIG. 11.

FIG. 17 shows the order of pre-reading pages which occurs in the case where the multi-drive controller 3B receives access information from the work station WS-A, the access information requiring the documents I, J, and K to be printed in the reverse order. Firstly, the last page I-4 of the documents I is read out from the disk 5, and is transmitted to and printed in the work station. During the printing of the page I-4, the pages I-3, I-2, and I-1 of the documents I are sequentially pre-read. In addition, the pages J-7, J-6, . . . are sequentially pre-read. In this way, the pages are pre-read in the order which agrees with the order of the printing of the pages.

Figure 18:
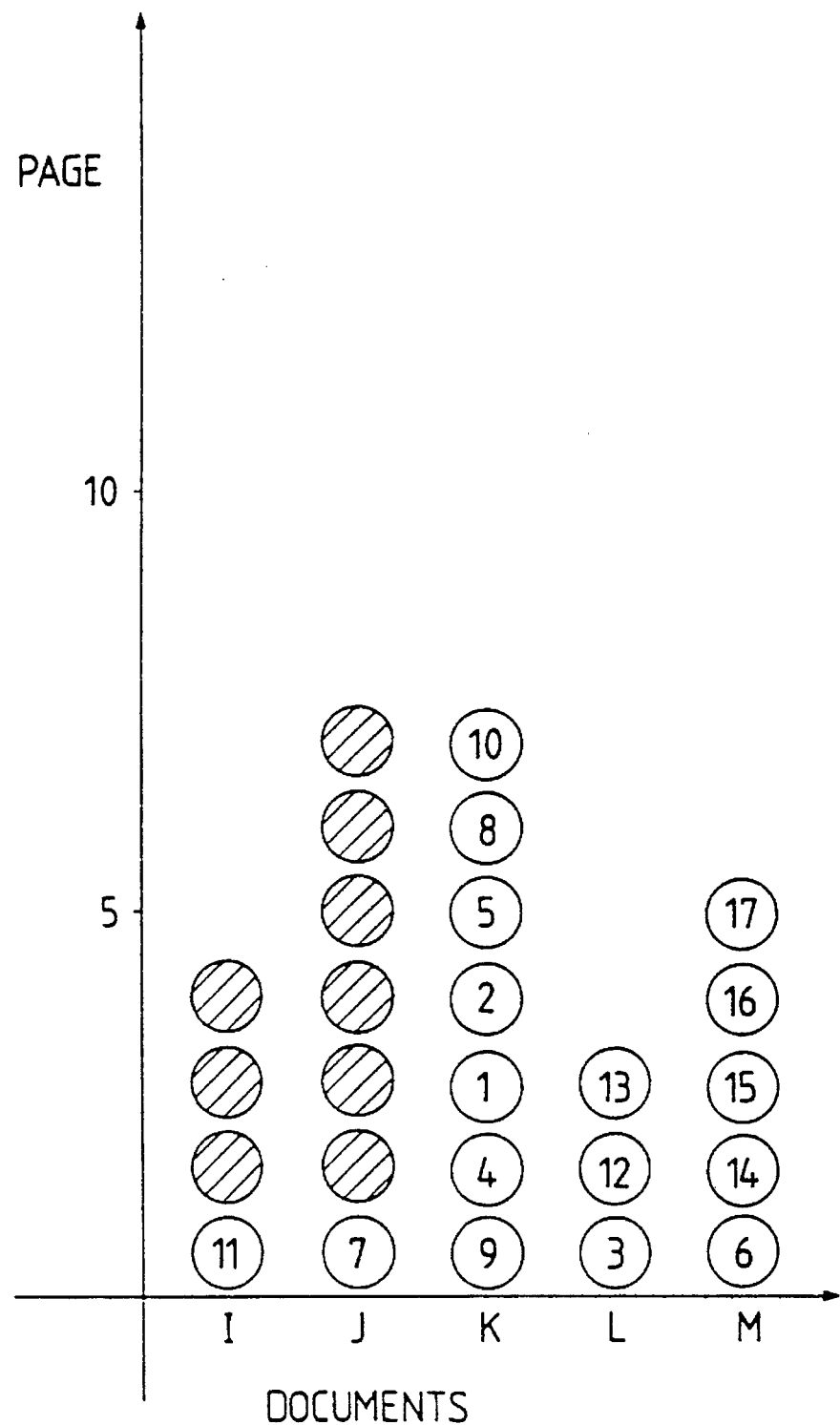
FIG. 18 is a diagram showing a random order in which pages are read out in the system of FIG. 11.

FIG. 18 relates to an example of the pre-reading process which occurs in the case where normal random access to documents I, J, K, L, and M is done. Specifically, the multi-drive controller 3B receives access information from the work station WS-B, the access information requiring normal random access to the documents I, J, K, L, and M. It is now assumed that the documents I, J, K, L, and M have four pages, seven pages, seven pages, three pages, and five pages respectively, and that the documents I, J, K, L, and M are contained in a common disk 5. FIG. 18 shows the order of pre-reading pages which is determined upon the read-out of the third page K-3 of the documents K. As shown in FIG. 18, the pre-read orders of the pages are determined in accordance with weights which are varied as a function of distances from the third page K-3 of the documents K. The distances from the third page K-3 of the documents K depend on the spatial differences between the documents and the spatial differences between the pages.

Figure 19:
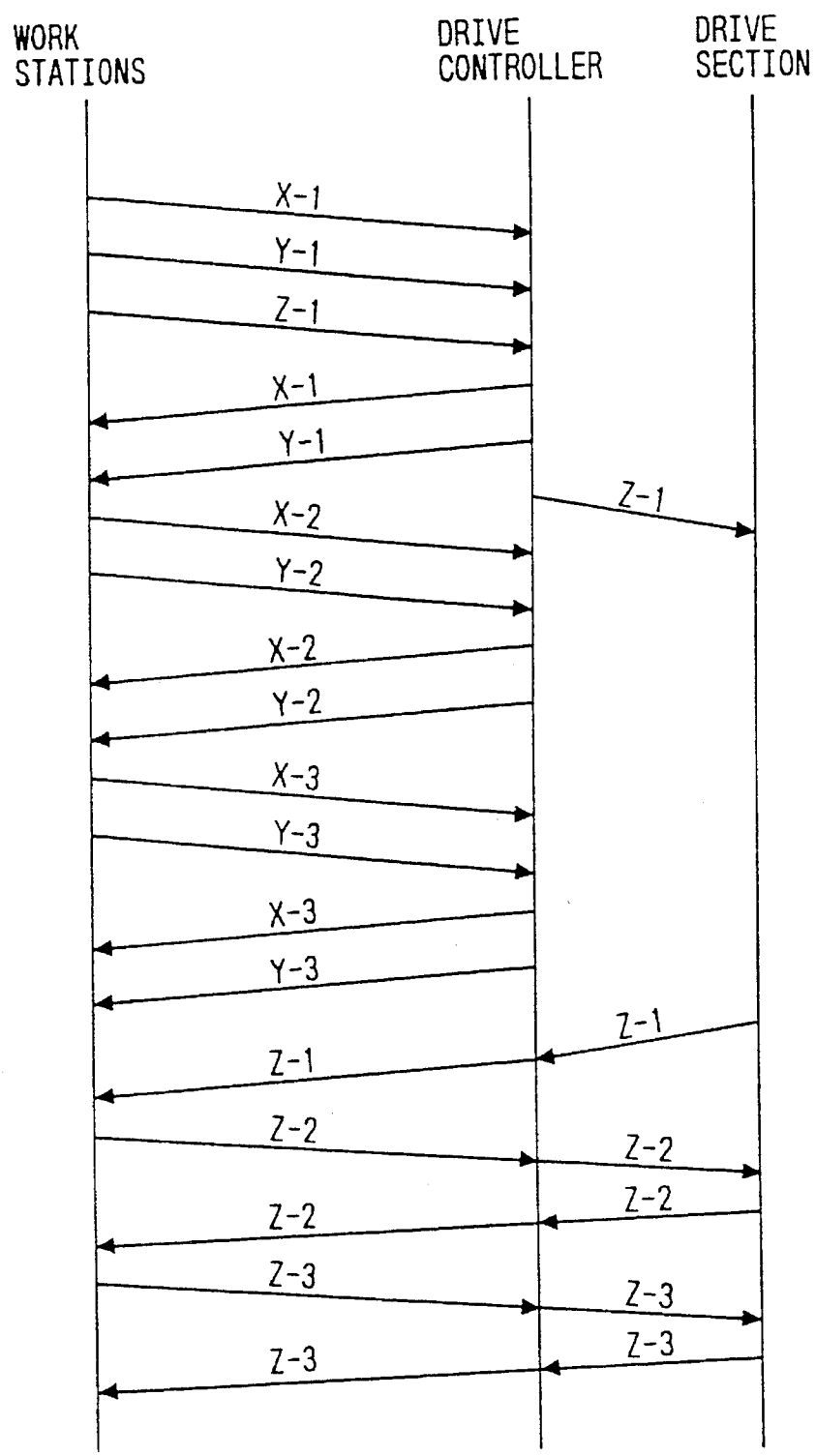
FIG. 19 is a diagram showing a sequence of commands and responses in system of FIG. 11.

The operation of this embodiment will be further described with reference to FIG. 19. A description will be given of the case where the work stations WS-A, WS-B, and WS-C read out documents X, Y, and Z respectively. It is now assumed that the documents X and Y are already stored in the memory 8 by a pre-reading process, and that a disk containing the documents Z is not set in a disk drive 7. As shown in FIG. 19, commands from the work stations WS-A and WS-B which require reading out the pages X-1, X-2, and X-3 of the documents X and the pages Y-1, Y-2, and Y-3 of the documents Y are transferred to the multi-drive controller 3B via the file controller 2, and related responses are promptly returned from the multi-drive controller 3B to the work stations WS-A and WS-B via the file controller 2 since the documents X and Y are stored in the memory 8. Commands from the work stations WS-C which require reading out the pages Z-1, Z-2, and Z-3 of the documents Z are transferred to the multi-drive controller 3B via the file controller 2. Since the documents Z are absent from the memory 8 and also the disks in the disk drives 7, the multi-drive controller 3B activates the carrier mechanism 6 so that a disk containing the documents Z will replace the current disk in one of the disk drives 7, 7'. Then, the multi-drive controller 3B reads out the data of the first page Z-1 of the documents Z from the disk 5 via the disk drive 7, and returns a related response to the work station WS-C via the file controller 2. During a subsequent period, the multi-drive controller 3B receives the commands of reading out the pages Z-2 and Z-3, and the multi-drive controller 3B reads out the data of the pages Z-2 and Z3 from the disk 5 and returns related responses to the work station WS-C via the file controller 2.

Figure 20:
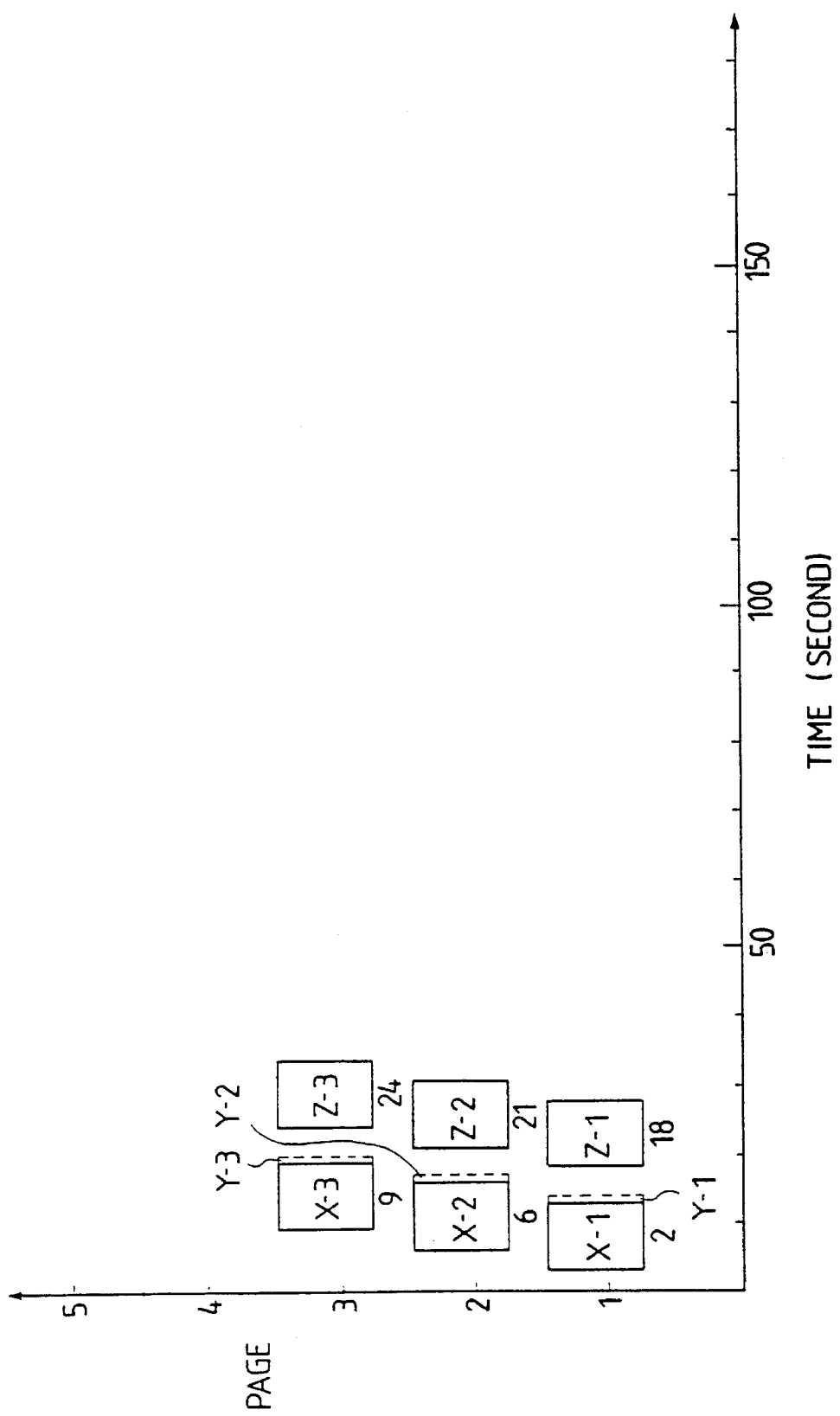
FIG. 20 is a time-domain diagram showing timings of execution of commands in the system of FIG. 11.

FIG. 20 is a timing chart showing conditions of the information processing operation which corresponds to the operation sequence of FIG. 19. In FIG. 20, the abscissa denotes an elapsed time (second), and the ordinate denotes a page number. In FIG. 20, numerals written below the boxes containing the page-denoting characters represent elapsed times up to the moments of the completion of the information indications in the work stations WS-A, WS-B, and WS-C. Specifically, indicating information in the work stations WS-A, WS-B, and WS-C spends two seconds, and access to a disk drive 7 spends one second while the change of a disk 5 in a disk drive 7 spends fifteen seconds. As shown in FIG. 20, the processing on the page X-n (n=1, 2, and 3) and the processing on the page Y-n (n=1, 2, and 3) are expressed as overlapping each other in a time domain.

DESCRIPTION OF THE FOURTH PREFERRED EMBODIMENT

Figure 21:
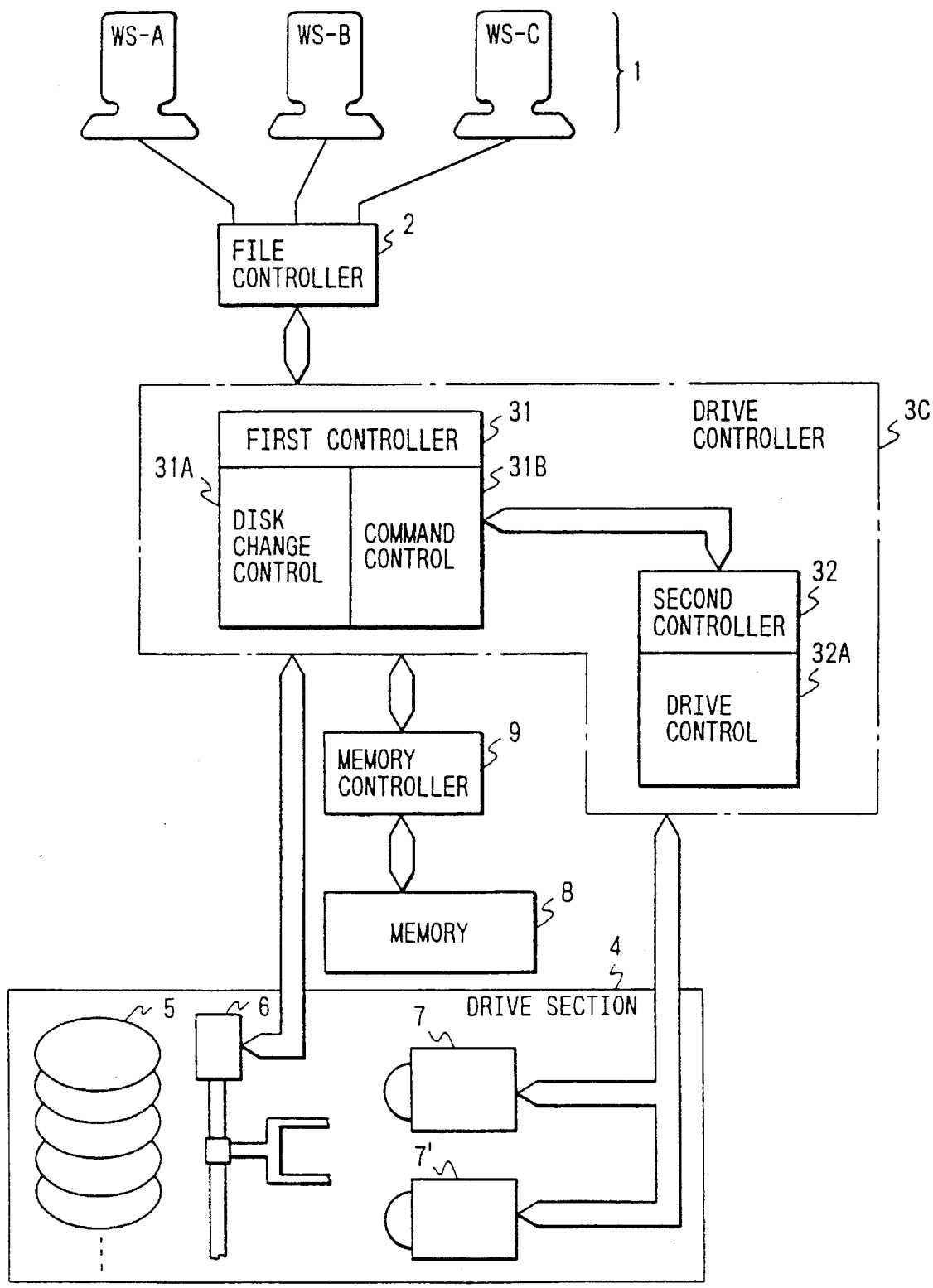
FIG. 21 is a block diagram of an electronic file system according to a fourth embodiment of this invention.
Figure 22:
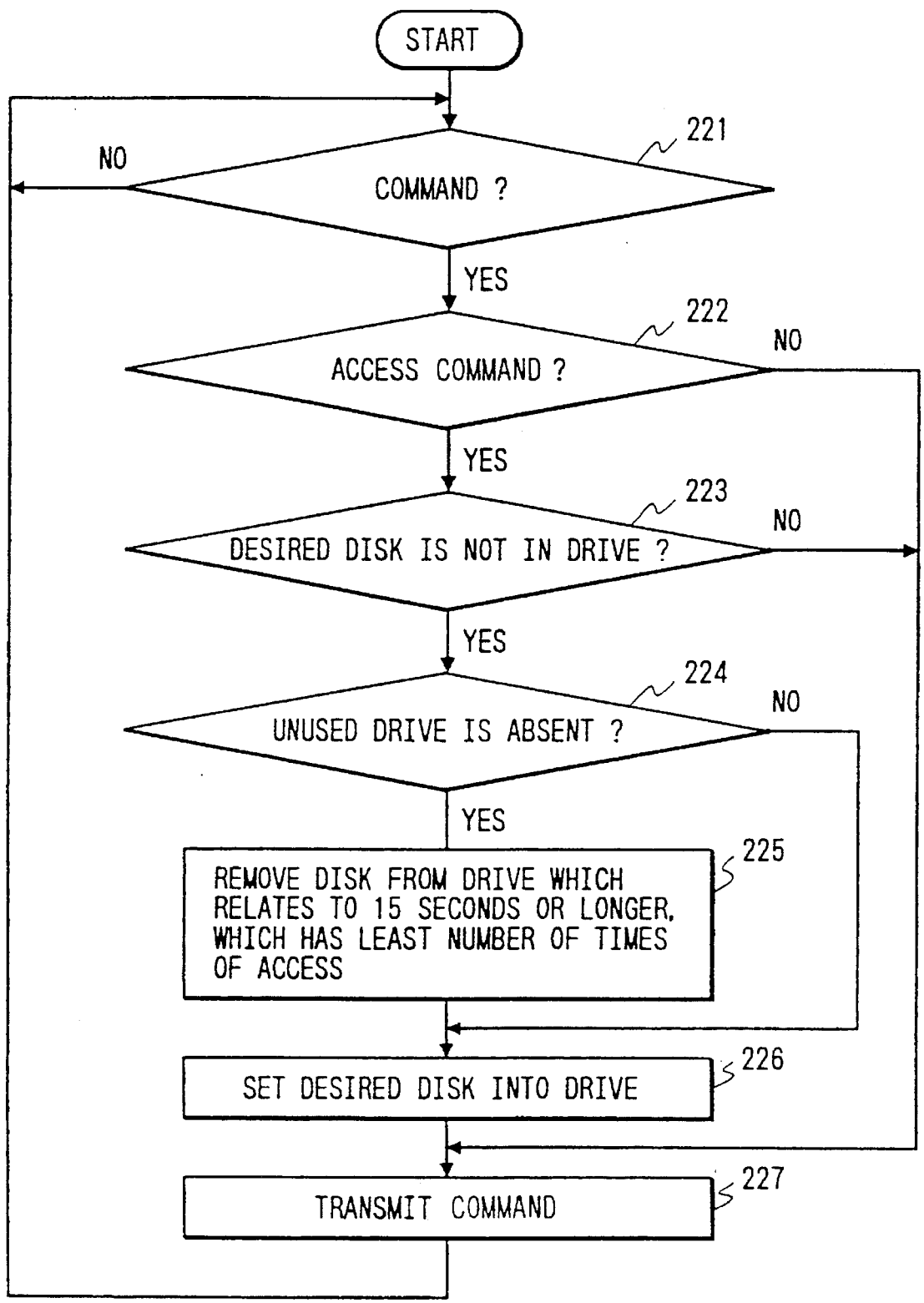
FIG. 22 is a flowchart of a program operating the multi-drive controller of FIG. 21.

FIG. 21 shows a fourth embodiment of this invention which is similar to the embodiment of FIGS. 8–10(c) except that the fourth embodiment includes a modified multi-drive controller 3C. The multi-drive controller 3C operates in accordance with a program. FIG. 22 is a flowchart of a portion of the program.

As shown in FIG. 22, a first step 221 of the portion of the program decides whether or not a command is received from work stations 1. When a command is not received, the step 221 is reiterated. When a command is received, the program advances to a step 222.

The step 222 decides whether or not the received command agrees with a disk access command. When the received command agrees with a disk access command, the program advances to a step 223. Otherwise, the program jumps to a step 227.

The step 223 decides whether or not a disk 5 required by the disk access command is already set in a disk drive 7. When the required disk 5 is not set in the disk drive 7, the program advances to a step 224. When the required disk 5 is already set in the disk drive 7, the program jumps to the step 227.

The step 224 decides whether or not an unused disk drive 7 is present. When an unused disk drive 7 is absent, that is, when all the disk drives 7, 7' are in use, the program advances to a step 225. When an unused disk drive 7 is present, the program jumps to a step 226.

For each of the disk drives 7, the step 225 decides whether a time elapsed since the moment of setting a disk 5 into the disk drive 7 reaches a reference time, for example, fifteen seconds. The step 225 detects one or more of the disk drives 7 which meet the previously-mentioned conditions of the elapsed time. The step 225 selects one of the detected disk drives 7 which has been exposed to access the least number of times. The step 225 controls a carrier mechanism 6, and thereby removes the disk 5 from the selected disk drive 7' to open the disk drive 7. After the step 225, the program advances to the step 226.

The step 226 controls the carrier mechanism 6, and thereby sets a disk 5, required by the received disk access command, into the open disk drive 7'. After the step 226, the program advances to the step 227.

The step 227 outputs the received command to execute the received command. After the step 227, the program returns to the step 221.

Figure 23:
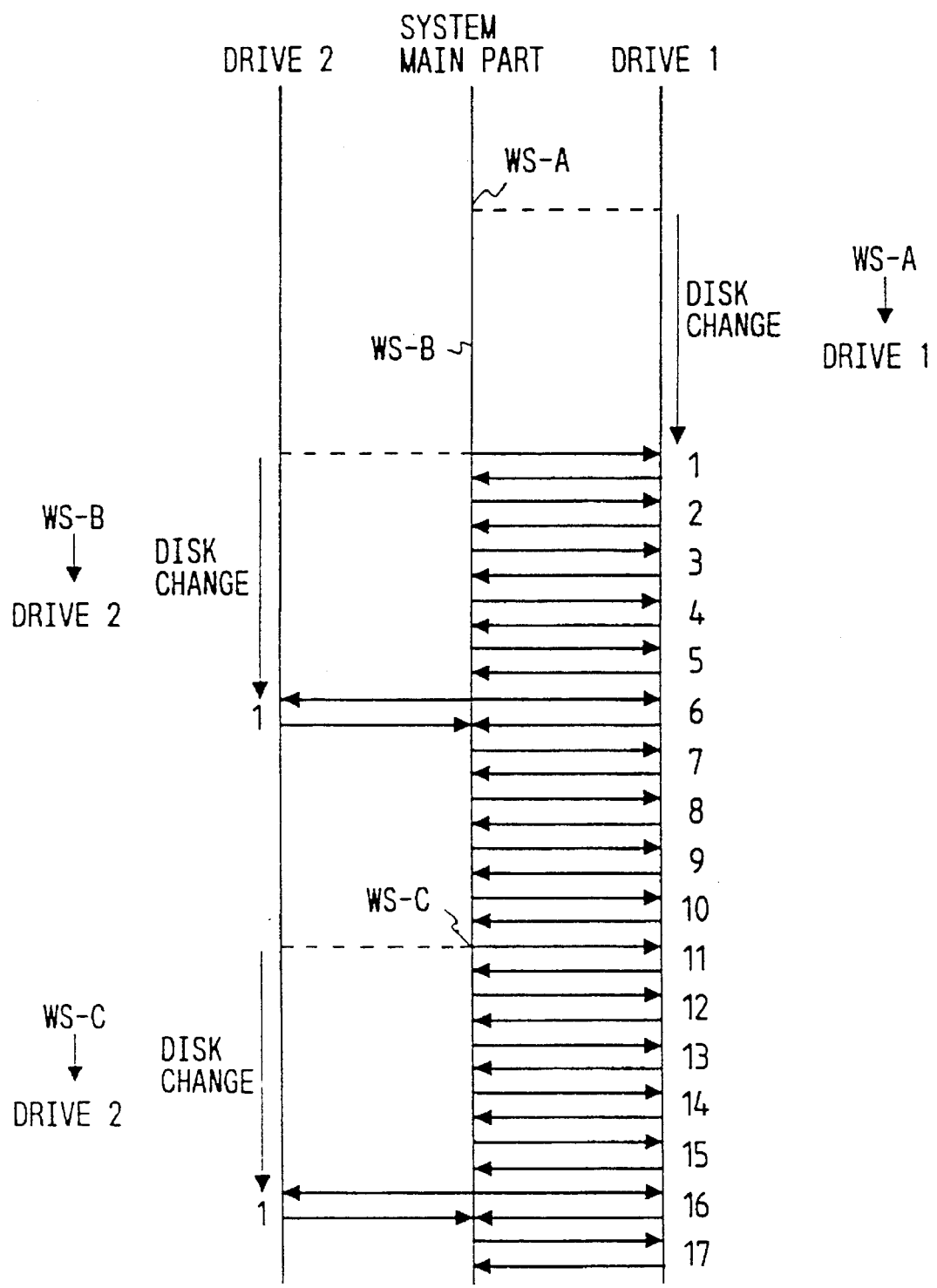
FIG. 23 is a diagram showing a sequence of commands and responses in the system of FIG. 21.

With reference to FIG. 23, an example of the operation of this embodiment will be further described in the following description, the disk drives 7, 7' are identified by "1" and "2" respectively. When the multi-drive controller 3C receives a disk access command from the work station WS-A, the multi-drive controller 3C controls the carrier mechanism 6 so that the current disk will be removed from a disk drive "1" and a disk 5 required by the received disk access command will be set into the disk drive "1" therefor. During the change of the disks in the disk drive "1", the multi-drive controller 3C receives a disk access command from the work station WS-B. Before the change of the disks in the disk drive "1" is completed, the received access command from the work station WS-B remains undone. When the change of the disks in the disk drive "1" is completed, the multi-drive controller 3C starts a process of removing the current disk from a disk drive "2" and setting a disk, required by the disk access command from the work station WS-B, into the disk drive "2" therefor. In addition, the multi-drive controller 3C starts access to the disk in the disk drive "1" in response to the related disk access command. When the change of the disks in the disk drive "2" is completed, the multi-drive controller 3C starts access to the disk in the disk drive "2" in response to the related disk access command. The access to the disk in the disk drive "2" is completed in a short time. During the change of the disks in the disk drive "2" and the execution of the access to the disk in the disk drive "2", the access to the disk in the disk drive "1" continues. Thereafter, the access to the disk in the disk drive "1" continues, and the multi-drive controller 3C receives a disk access command from the work station WS-C. The received disk access command from the work station WS-C requires a disk different from the current disks in the disk drives "1" and "2". The step 225 of FIG. 22 does not select the disk drive "1" since a step of the access to the disk in the disk drive "1" is executed a greater number of times while a step of the access to the disk in the disk drive "2" is executed a smaller number of times. When fifteen seconds elapses since the moment of the change of the disks in the disk drive "2", the multi-drive controller 3C selects the disk drive "2". Specifically, the multi-drive controller 3C starts a process of removing the current disk from the disk drive "2" and setting a new disk, required by the disk access command from the work station WS-C, into the disk drive "2" therefor.

Figure 24:
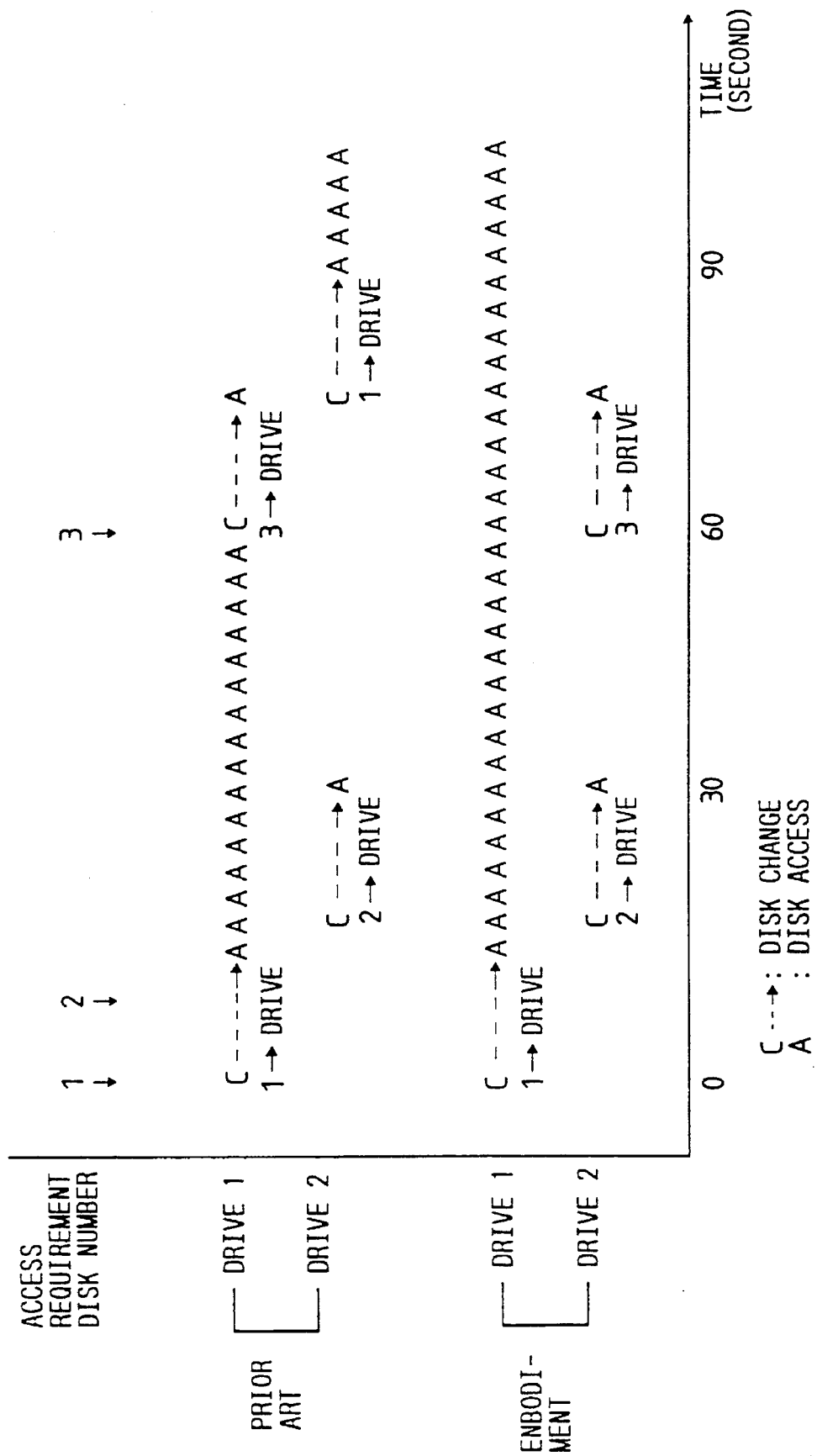
FIG. 24 is a time-domain diagram showing use conditions of disk drives in the system of FIG. 21 and also in a prior art system.

As shown in FIG. 24, according to a prior art design, disks are forcedly changed in a disk drive "1" in response to a third disk access command. On the other hand, according to this embodiment, disks are not changed in the disk drive "1" in response to the third disk access command and the access to the disk in the disk drive "1" is continued but disks are changed in the disk drive "2" in response to the third disk access command. Thus, in this embodiment, wasteful change of disks in the disk drive "1" is prevented and the access to the disk in the disk drive "1" is efficiently continued, so that the efficiency of the use of the disk drives "1" and "2" can be increased relative to the prior art design.

DESCRIPTION OF THE FIFTH PREFERRED EMBODIMENT

Figure 25:
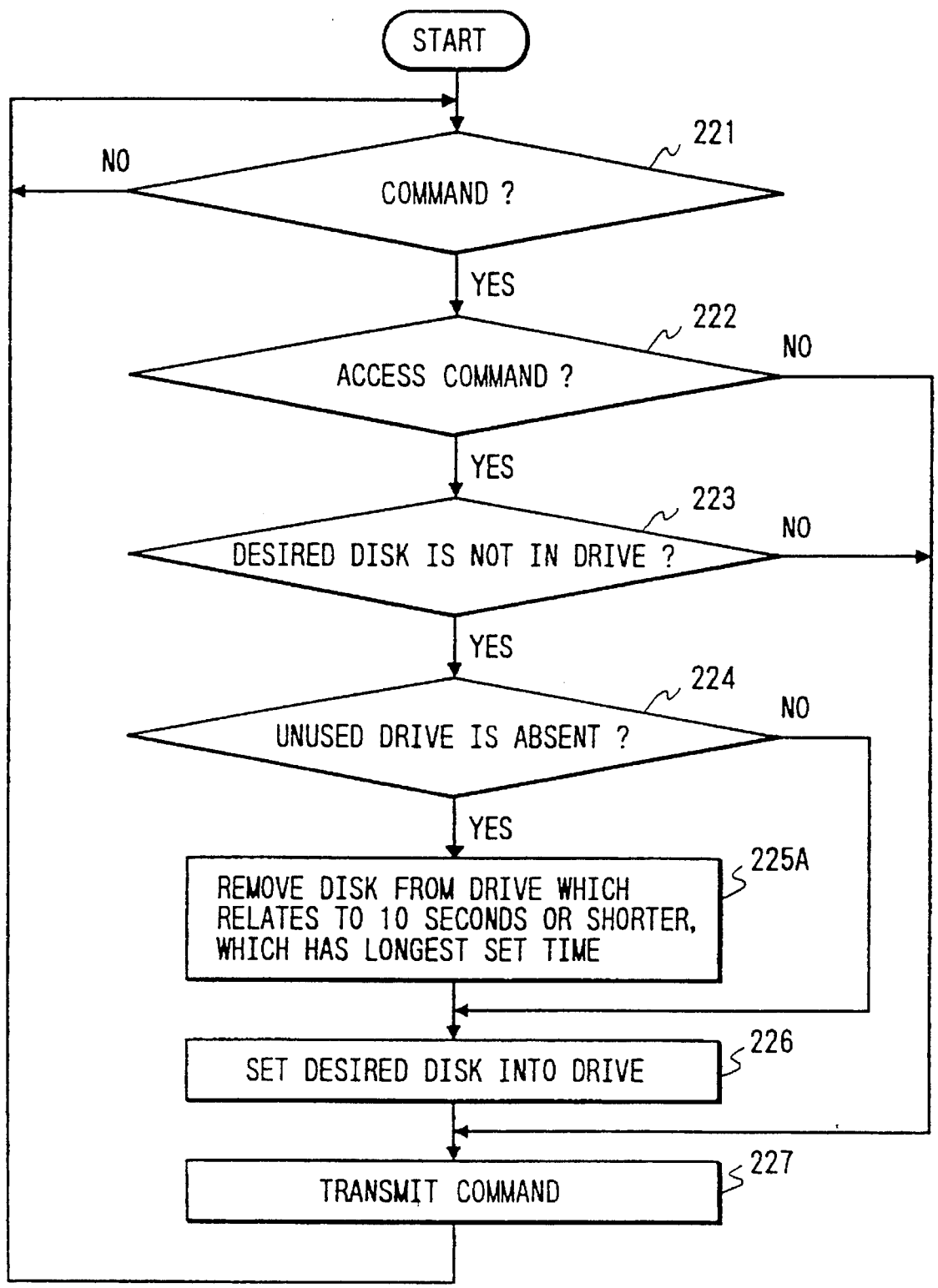
FIG. 25 is a flowchart of a program operating a multi-drive controller in an electronic file system according to a fifth embodiment of this invention.

FIG. 25 relates to a fifth embodiment of this invention which is similar to the embodiment of FIGS. 21–24 except that the fifth embodiment includes a modified step 225A in place of the step 225 of FIG. 22.

For each of disk drives 7, the step 225A decides whether a first time elapsed, since the moment of writing data into a disk 5 in the disk drive 7, reaches a reference time, for example, ten seconds. The step 225A detects one or more of the disk drives 7, 7' which meet the previously-mentioned conditions of the first elapsed time. The step 225A selects one of the detected disk drives 7, 7' based upon second elapsed time for each, the time elapsed since the moment of setting a disk 5 into the disk drive 7. The step 225A selects one of the detected disk drives 7 which relates to the longest second elapsed time. The step 225A controls a carrier mechanism 6, and thereby removes the disk 5 from the selected disk drive 7 to open the disk drive 7'.

Figure 26:
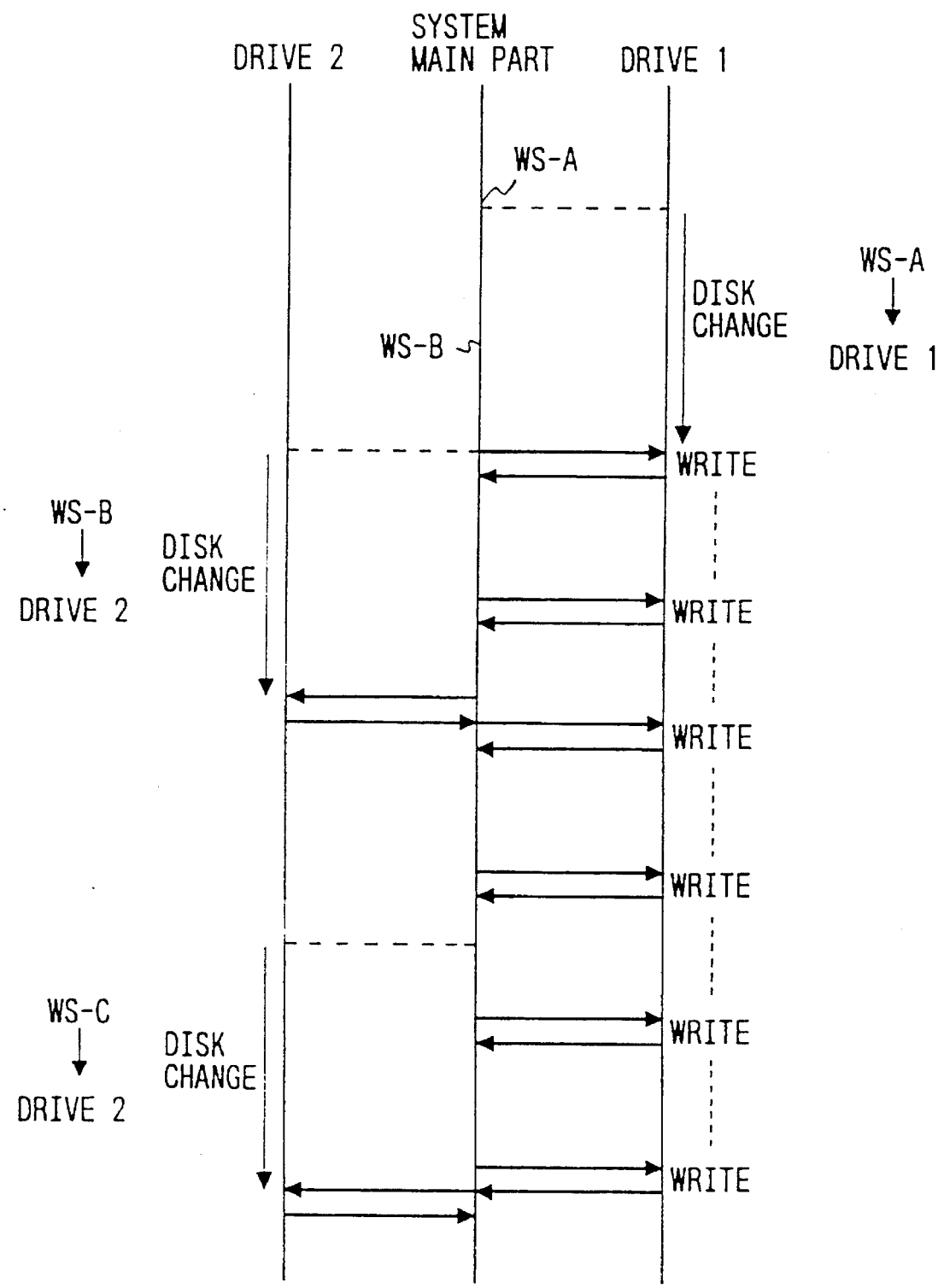
FIG. 26 is a diagram showing a sequence of commands and responses in the system of the fifth embodiment of this invention.

With reference to FIG. 26, an example of the operation of this embodiment will be further described. In the following description, the disk drives 7, 7' are identified by "1" and "2" respectively. When the multi-drive controller 3C receives a data write command from the work station WS-A, the multi-drive controller 3C controls the carrier mechanism 6 so that the current disk will be removed from a disk drive "1" and a disk 5 required by the received data write command will be set into the disk drive "1" therefor. During the change of the disks in the disk drive "1", the multi-drive controller 3C receives a disk access command from the work station WS-B. Before the change of the disks in the disk drive "1" is completed, the received disk access command from the work station WS-B remains undone. When the change of the disks in the disk drive "1" is completed, the multi-drive controller 3C starts a process of removing the current disk from a disk drive "2" and setting a disk, required by the disk access command from the work station WS-B, into the disk drive "2" therefor. In addition, the multi-drive controller 3C starts writing data into the disk in the disk drive "1" in response to the related data write command. When the change of the disks in the disk drive "2" is completed, the multi-drive controller 3C starts access to the disk in the disk drive "2" in response to the related disk access command. The access to the disk in the disk drive "2" is completed in a short time. During the change of the disks in the disk drive "2" and the execution of the access to the disk in the disk drive "2", steps of writing data into the disk in the disk drive "1" continue. Thereafter, steps of writing data into the disk in the disk drive "1" continue, and the multi-drive controller 3C receives a disk access command from the work station WS-C. The received disk access command from the work station WS-C requires a disk different from the current disks in the disk drives "1" and "2". The step 225A of FIG. 25 does not select the disk drive "1" since steps of writing the data into the disk in the disk drive "1" continue to be executed at intervals shorter than ten seconds. The first elapsed time related to the disk drive "2" reaches ten seconds, so that the step 225A selects the disk drive "2". Specifically, the multi-drive controller 3C executes a process of removing the current disk from the disk drive "2" and setting a new disk, required by the disk access command from the work station WS-C, into the disk drive "2" therefor.

Figure 27:
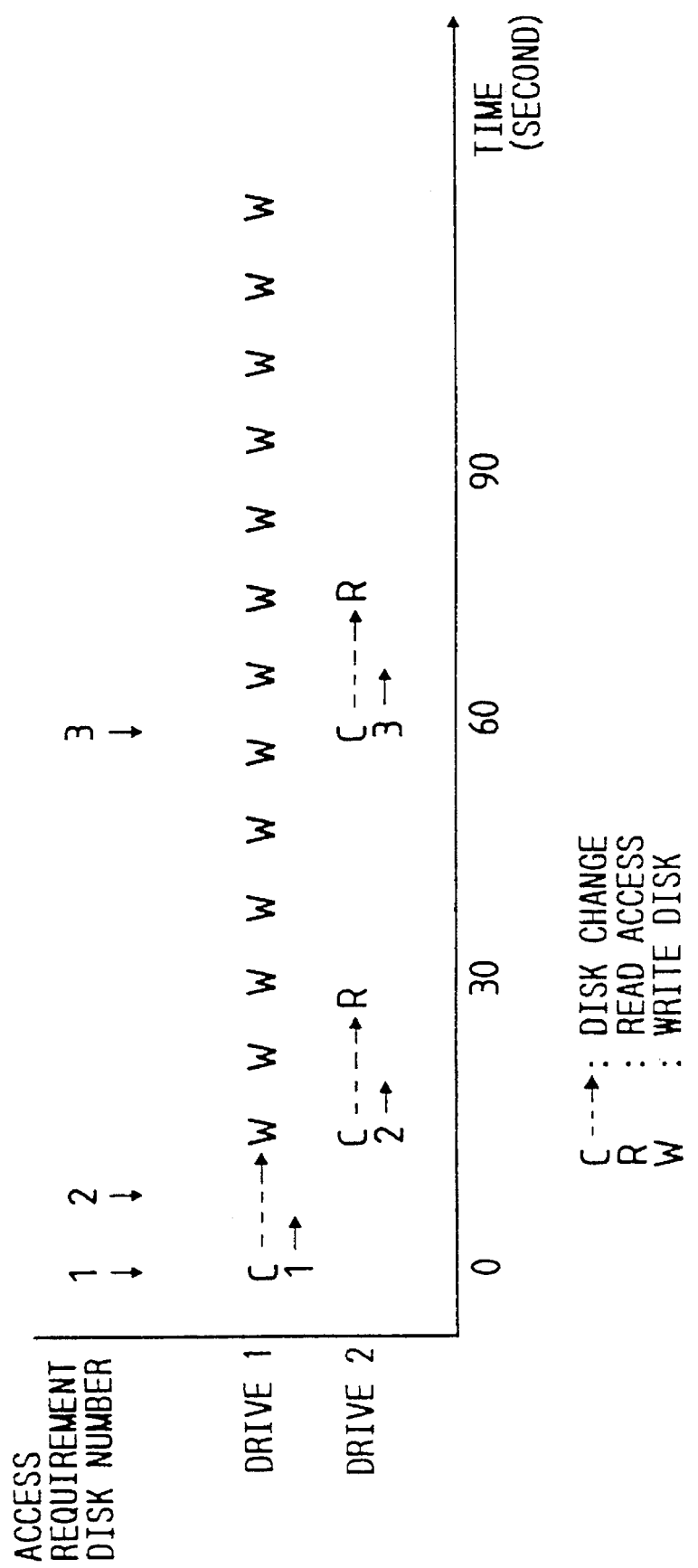
FIG. 27 is a time-domain diagram showing use conditions of disk drives in the system of the fifth embodiment of this invention.

As shown in FIG. 27, according to this embodiment, disks are not changed in the disk drive "1" in response to the disk access command from the work station WS-C, and the steps of writing the data into the disk in the disk drive "1" continue to be executed. During the execution of the steps of writing the data into the disk in the disk drive "1", steps of reading out data from the disks in the disk drive "2" are executed in short times in response to the disk access commands from the work stations WS-B and WS-C.

DESCRIPTION OF THE SIXTH PREFERRED EMBODIMENT

Figure 28:
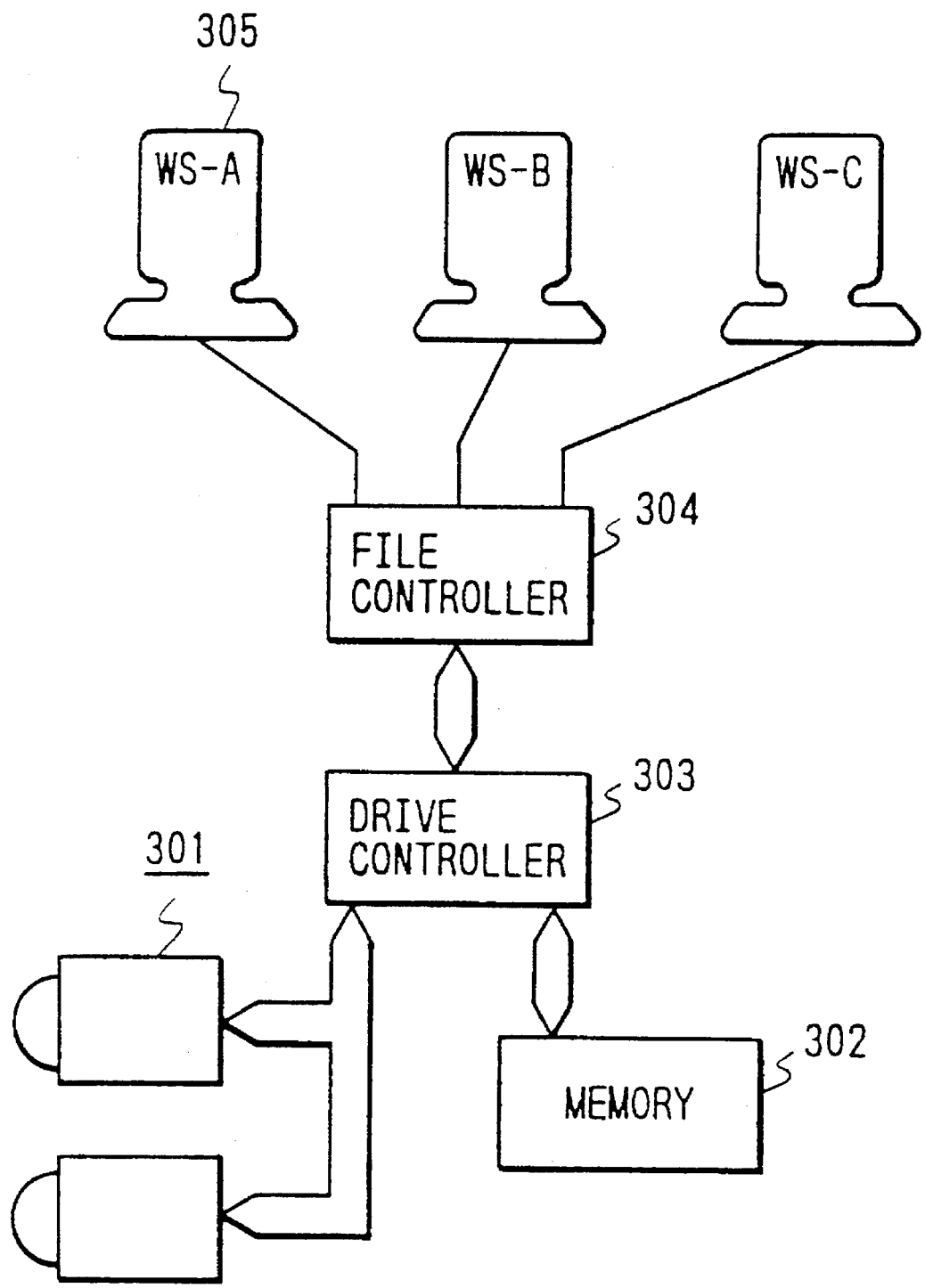
FIG. 28 is a block diagram of an electronic file system according to a sixth embodiment of this invention.

With reference to FIG. 28, an electronic file system of the multi-disk-drive type includes a multi-drive section 301, a memory 302, a multi-drive controller 303, a file controller 304, and a plurality of work stations 305 (WS-A, WS-B, and WS-C). The work stations 305 are also referred to as terminal devices.

Various commands can be inputted via the work stations 305. The file controller 304 constitutes an interface which connects the work stations 305 and the multi-drive controller 303. The input commands are transmitted to the multi-drive controller 303 via the file controller 304. The multi-drive controller 303 controls the multi-drive section 301 in response to the input commands. The multi-drive controller 303 also controls the memory 302. During access to the multi-drive section 301, the memory 302 serves to temporarily store data (information) read out from the multi-drive section 301. The multi-drive controller 303 outputs the read-out information to the file controller 304. Then, the read-out information is transmitted to the work stations 305, being indicated and processed in the work stations 305.

The multi-drive section 301 includes a plurality of data (information) recording disks, two disk drives "1" and "2", and means for removing and setting the disks from and into the disk drives "1" and "2".

Figure 29A:
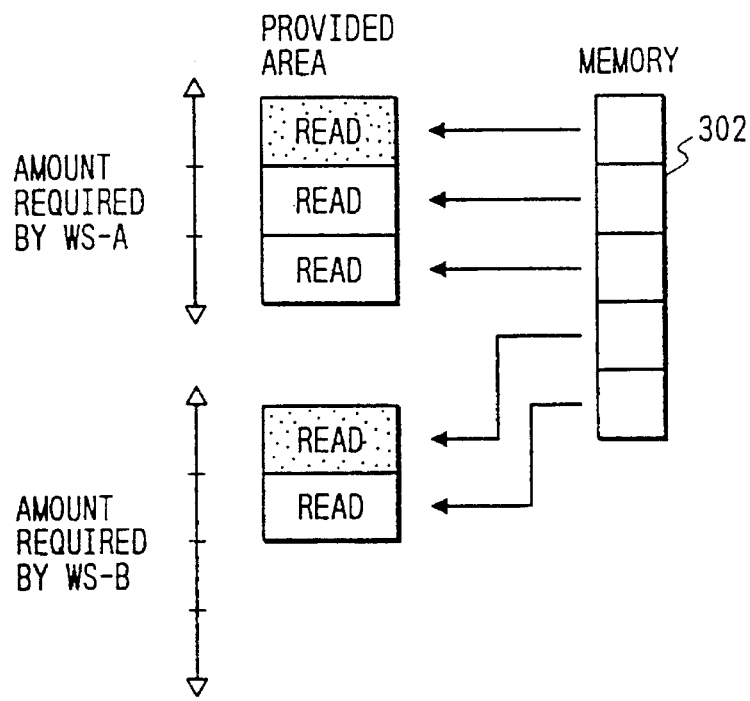
FIGS. 29(a) and 29(b) are diagrams showing use conditions of the memory of FIG. 28.
Figure 29B:
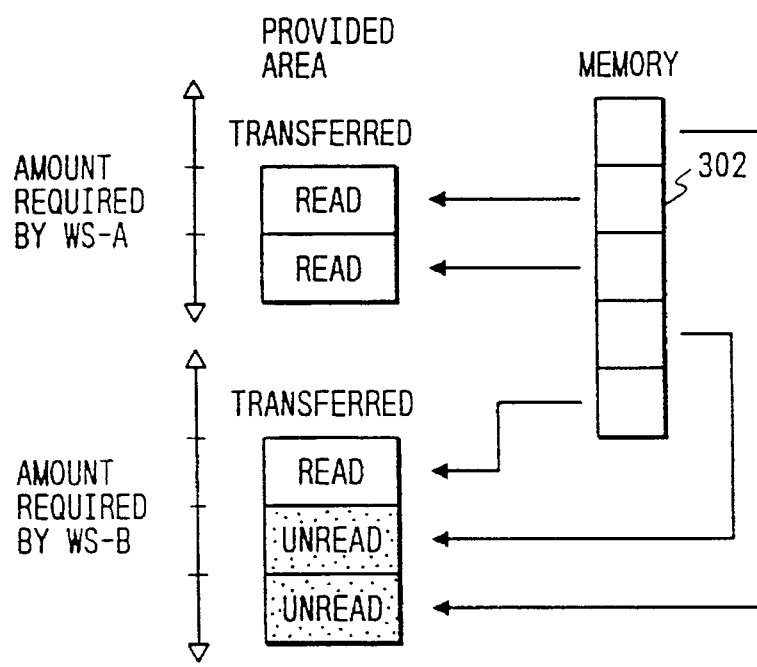

The memory 302 has a predetermined capacity of, for example, five megabytes. The multi-drive controller 303 controls the memory 302 in response to commands from the work stations 305 as follows. It is now assumed that the work station WS-A requires three megabytes of the memory 302 and also requires access to the multi-drive section 301. The multi-drive controller 303 executes the access to the multi-drive section 301 in response to the requirement from the work station WS-A. Under these conditions, when the work station WS-B requires four megabytes and also requires access to the multi-drive section 301, the multi-drive controller 303 allots three megabytes and two megabytes of the memory 302 to the work stations WS-A and WS-B respectively as shown in FIG. 29(a). In the state shown by FIG. 29(a), one third of the three megabytes allotted to the work station WS-A is occupied by data read out from the multi-drive section 301, and a half of the two megabytes allotted to the work station WS-B is occupied by data read out from the multi-drive section 301. After the data read-out required by the work station WS-A is completed, the multi-drive controller 303 decreases the memory part allotted to the work station WS-A by one megabyte and increases the memory part allotted to the work station WS-B by one megabyte as shown in FIG. 29(b).

Figure 30:
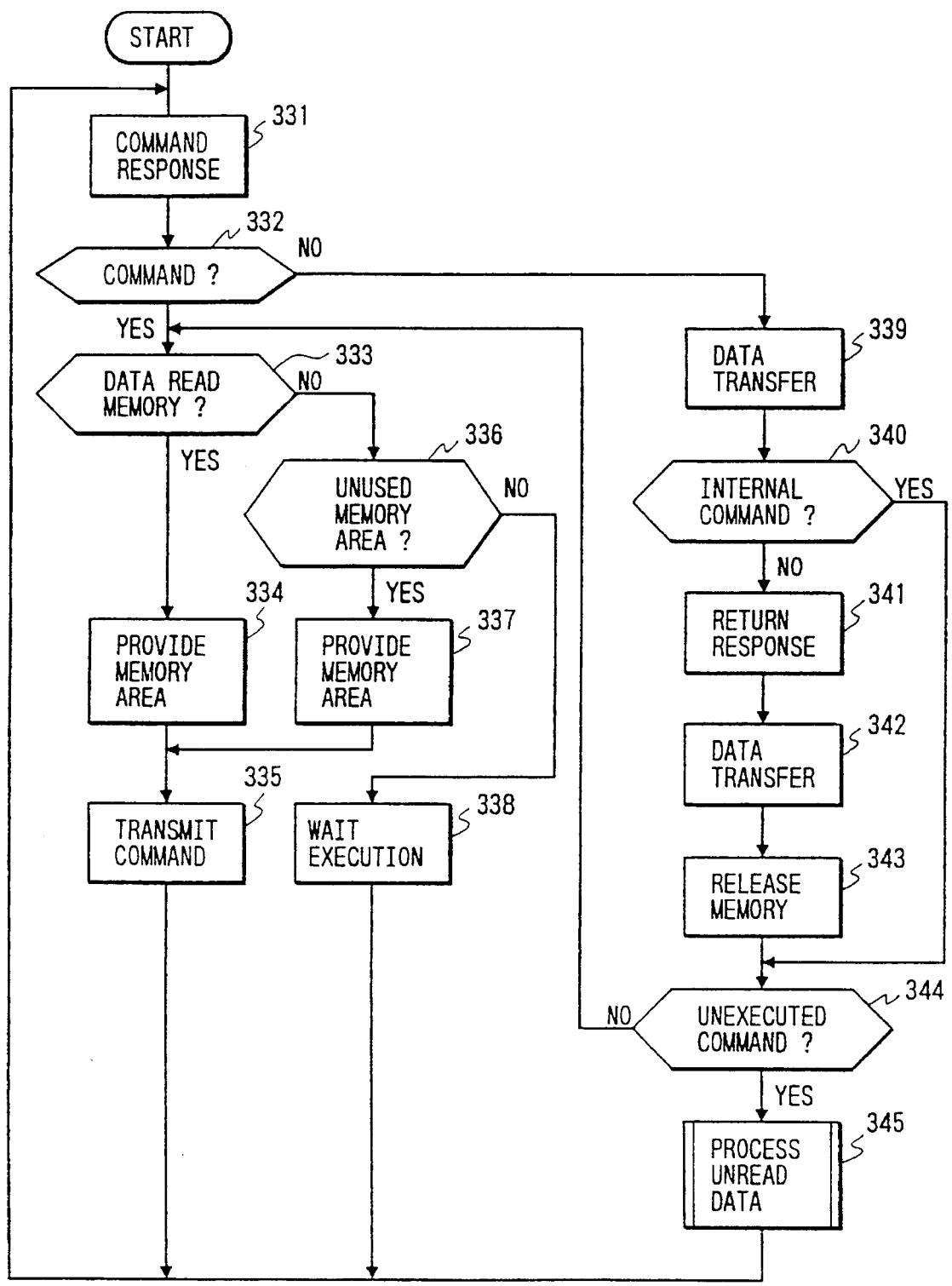
FIG. 30 is a flowchart of a program operating the multi-drive controller of FIG. 28.

The multi-drive controller 303 includes a combination of a processing section, a ROM, a RAM, and an input/output section. The multi-drive controller 303 operates in accordance with a program stored in the ROM. FIG. 30 is a flowchart of the program.

As shown in FIG. 30, a first step 331 of the program decides whether or not a command is received from work stations 305. In addition, the step 331 decides whether or not a response is received from the multi-drive section 301. When neither a command nor a response is received, the step 331 is reiterated. When a command or a response is received, the program advances to a step 332.

The step 332 decides which of a command and a response is received. When a command is received, the program advances to a step 333. When a response is received, the program advances to a step 339.

The step 333 checks whether or not the memory area, required by the received command, can be prepared in the memory 302. When the required memory area can be prepared in the memory 302, the program advances to a step 334. Otherwise, the program advances to a step 336.

The step 334 provides the required area in the memory 302. After the step 334, the program advances to a step 335 which outputs the received command to the multi-drive section 301 to execute the command. Data read out from the multi-drive section 301 in response to the command will be stored into the provided area of the memory 302. After the step 335, the program returns to the step 331.

The step 336 checks whether or not an unoccupied area is present in the memory 302. When an unoccupied area is present in the memory 302, the program advances to a step 337. Otherwise, the program advances to a step 338.

The step 337 allots the unoccupied area of the memory 302 to data related to the received command. After the step 337, the program advances to the step 335 which outputs the received command to the multi-drive section 301 to execute the command. Data read out from the multi-drive section 301 in response to the command will be stored into the allotted area of the memory 302.

The step 338 serves to wait the moment at which the memory 302 is released from the use by tile work station or stations 305 so that an unoccupied area appears in the memory 302. After the step 338, the program returns to the step 331.

The step 339 transfers data from the multi-drive section 301 to the memory 302. A step 340 following the step 339 checks whether or not a data reading command internally generated in the multi-drive controller 303 is present. When such a data reading command is absent, the program advances to a step 341. When such a data reading command is present, the program jumps to a step 344.

The step 341 transmits a response to the related work station 305, the response representing the transfer of the data to the memory 302. A step 342 following the step 341 transfers the data from the memory 302 to the related work station 305. A step 343 following the step 342 releases the memory 302 from the use by the work station 305, and provides an unoccupied area in the memory 302. After the step 343, the program advances to the step 344.

The step 344 checks whether or not a waited command is present. When such a command is absent, the program advances to the step 333. When such a command is present, the program advances to a block 345. After the block 345, the program returns to the step 331.

Figure 31:
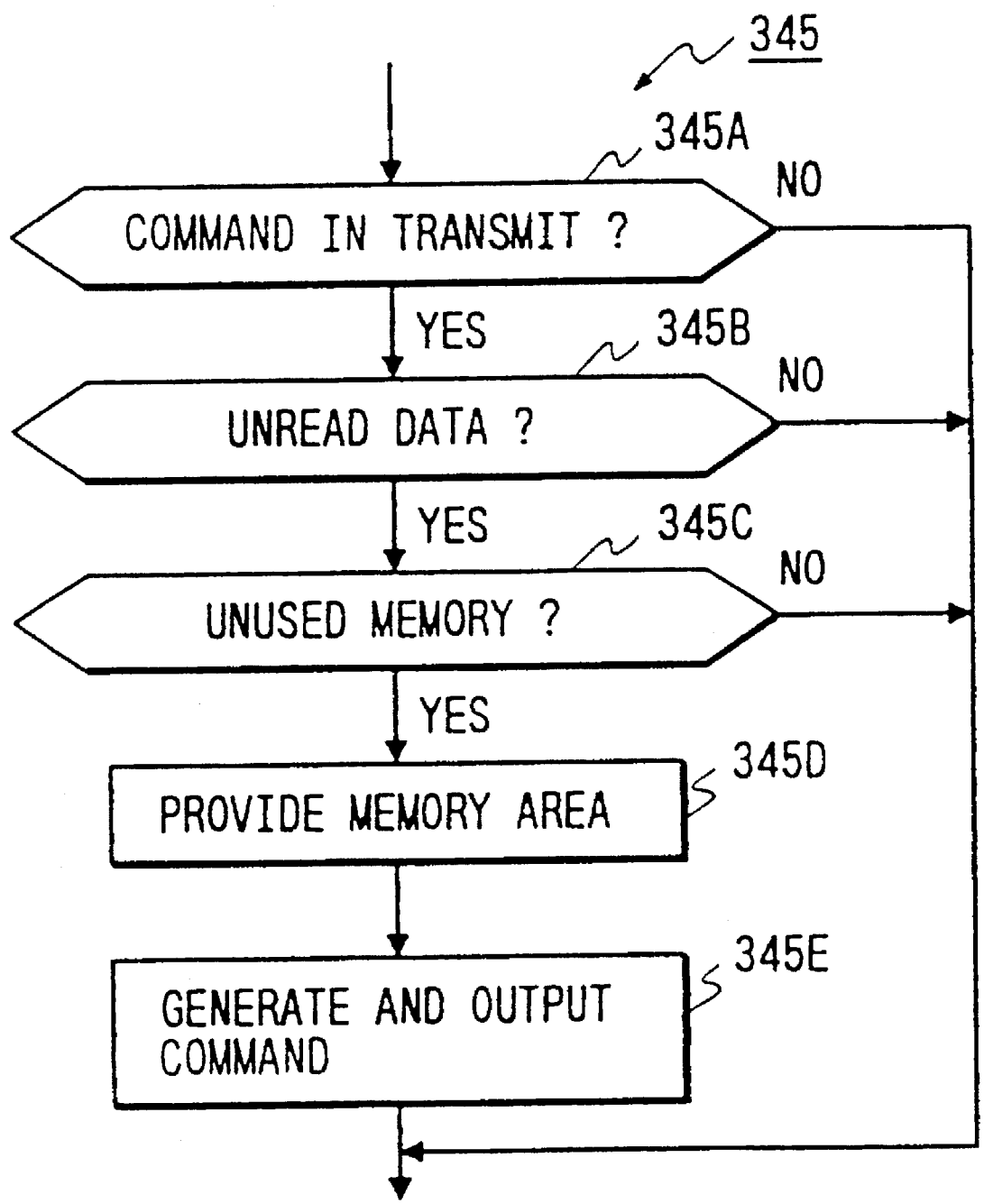
FIG. 31 is a diagram showing the internal design of the block of FIG. 30.

As shown in FIG. 31, the block 345 includes steps 345A–345E. The first step 345A in the block 345 checks whether or not a command in transmission is present. When such a command is absent, the program advances to the step 345B. Otherwise, the program moves out of the block 345.

The step 345B detects the presence and absence of conditions where unread data is present since only a part of the required area is provided in the memory 302. When such conditions are present, the program advances to the step 345C. Otherwise, the program moves out of the block 345.

The step 345C decides whether or not an unoccupied area is present in the memory 302. Such an unoccupied area results from the release of the memory 302. When an unoccupied area is present in the memory 302, the program advances to the step 345D. Otherwise, the program moves out of the block 345.

The step 345D allots the unoccupied area of the memory 302 to the unread data. The step 345D is followed by the step 345E. The step 345E generates a command of reading out the unread data. In addition, the step 345E outputs the generated command to the multi-drive section 301 to execute the read-out of the unread data. After the step 345E, the program moves out of the block 345.

Figure 32:
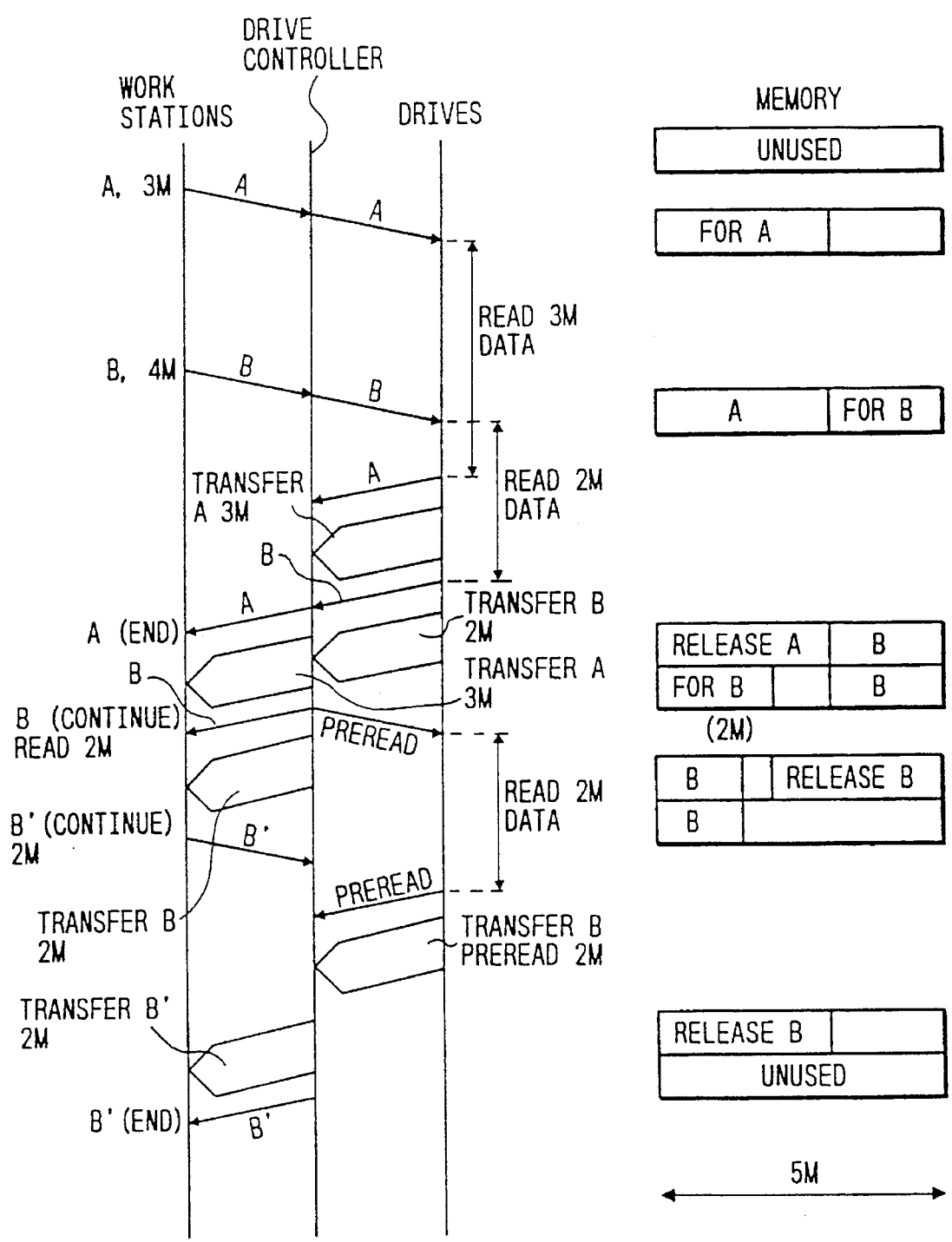
FIG. 32 is a diagram showing a sequence of commands and responses, and also use conditions of the memory in the system of FIG. 28.

With reference to FIG. 32, art example of the operation of this embodiment will be further described. The multi-drive controller 303 receives, from the work station WS-A, a data reading command with requiring three megabytes of the memory 302. The multi-drive controller 303 provides a three-megabyte area in the memory 303 and transfers data from the multi-drive section 301 to the provided three-megabyte area in the memory 302 in response to the command from the work station WS-A. During the transfer of the data to the three-megabyte area in the memory 302, the multi-drive controller 303 receives, from the work station WS-B, a data reading command with requiring four megabytes of the memory 302. The multi-drive controller 303 allots the unoccupied two megabytes of the memory 302 to the work related to the command received from the work station WS-B. In addition, the multi-drive controller 303 starts to transfer data from the multi-drive section 301 to the two-megabyte area in the memory 302 in response to the command from the work station WS-B. After the transfer of the data into the three-megabyte area in the memory 302 is completed, the multi-drive controller 303 transfers the data from the three-megabyte area in the memory 302 to the work station WS-A. The multi-drive controller 303 continues to transfer the data from the multi-drive section 301 to the two-megabyte area in the memory 302 in response to the command from the work station WS-B after the transfer of the data from the three-megabyte area in the memory 302 to the work station WS-A is completed. Since the three-megabyte area in the memory 302 is released as a result of the completion of the transfer of the data from the three-megabyte area to the work station WS-A, the multi-drive controller 303 newly allots two megabytes of the three-megabyte area to the work related to the command from the work station WS-B. Before the multi-drive controller 303 receives, from the work station WS-B, a requirement of reading out the unread data, the multi-drive controller 303 generates a data pre-reading command and outputs the data pre-reading command to the multi-drive section 301 to start reading out the unread data. During this period, the multi-drive controller 303 transfers the data from the firstly-allotted two-megabyte area in the memory 302 to the work station WS-B. Then, the multi-drive controller 303 receives, from the work station WS-B, a command of reading out the unread data. The unread data is transferred from the multi-drive section 301 to the secondly-allotted two-megabyte area in the memory 302 in response to the data pre-reading command. The multi-drive controller 303 transfers the data from the secondly-allotted two-megabyte area in the memory 302 to the work station WS-B. In this way, the time for which the work station WS-B waits can be shortened, and the efficiency of the use of the memory 302 can be increased.

DESCRIPTION OF THE SEVENTH PREFERRED EMBODIMENT

Figure 33:
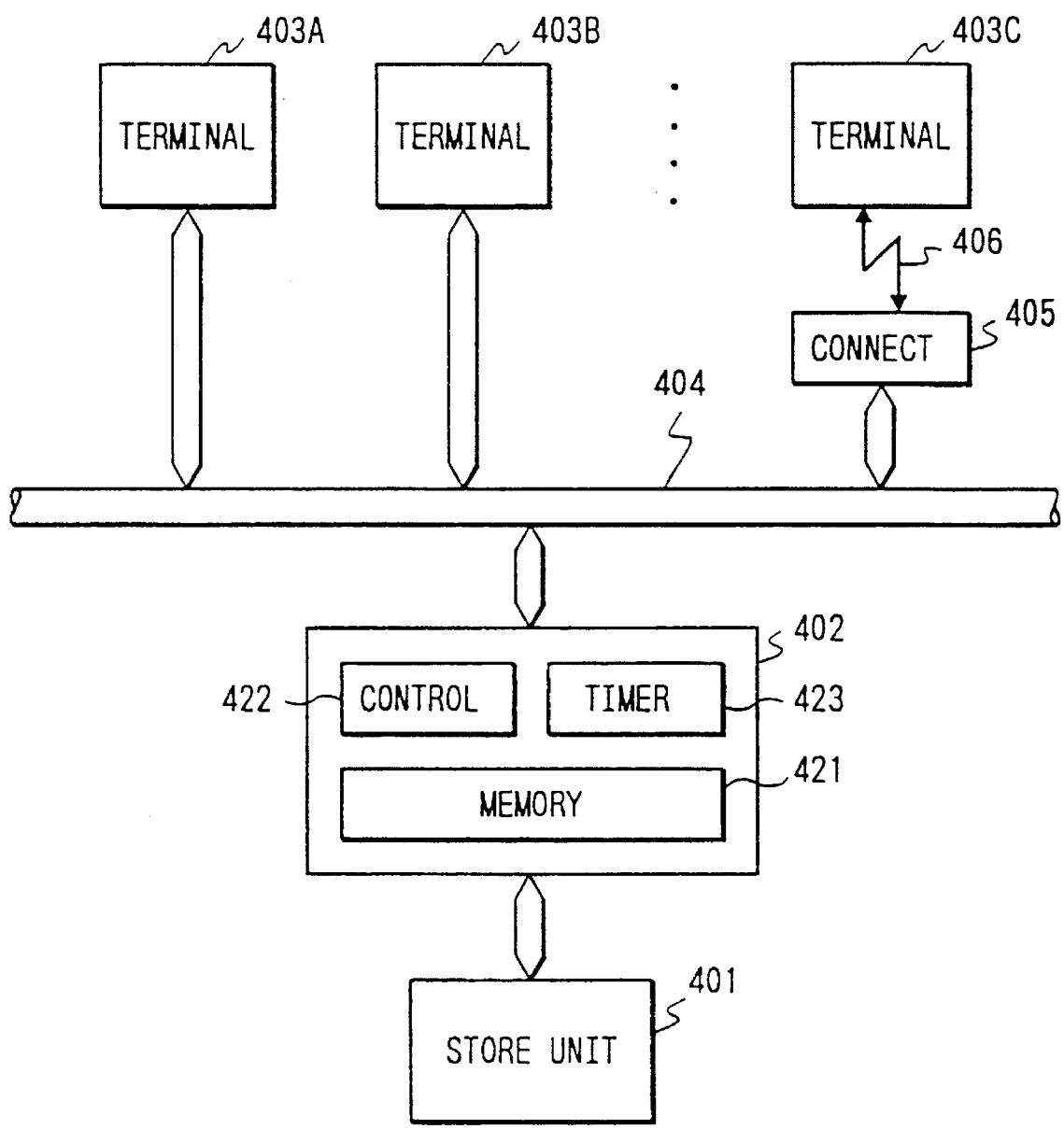
FIG. 33 is a block diagram of an electronic file system according to a seventh embodiment of this invention.

With reference to FIG. 33, an electronic file system includes a store unit 401, a pre-reading unit 402, and terminal devices 403A, 403B, and 403C. The store unit 401 includes, for example, an optical disk. The store unit 401 is connected to a line 404 via the pre-reading unit 402. The terminal devices 403A and 403B are directly connected to the line 404. The terminal device 403C is connected to the line 404 via a telephone line 406 and a line connecting unit 405.

The pre-reading unit 402 includes a cache memory 421, a controller 422, and a timer 423. The controller 422 responds to commands transmitted from the terminal devices 403A, 403B, and 403C. The controller 422 controls the cache memory 421, the store unit 401, and the timer 423. Specifically, the controller 422 executes a step of pre-reading data from the store unit 401, and a step of storing the pre-read data into the cache memory 421. In addition, the controller 422 controls the timer 423 so that the timer 423 can measure the sum of the intervals of storing pre-read page-corresponding data in the cache memory 421 for the respective terminal devices 403A–403C. The control executed by the controller 422 depends on the measured time sum.

Figure 34:
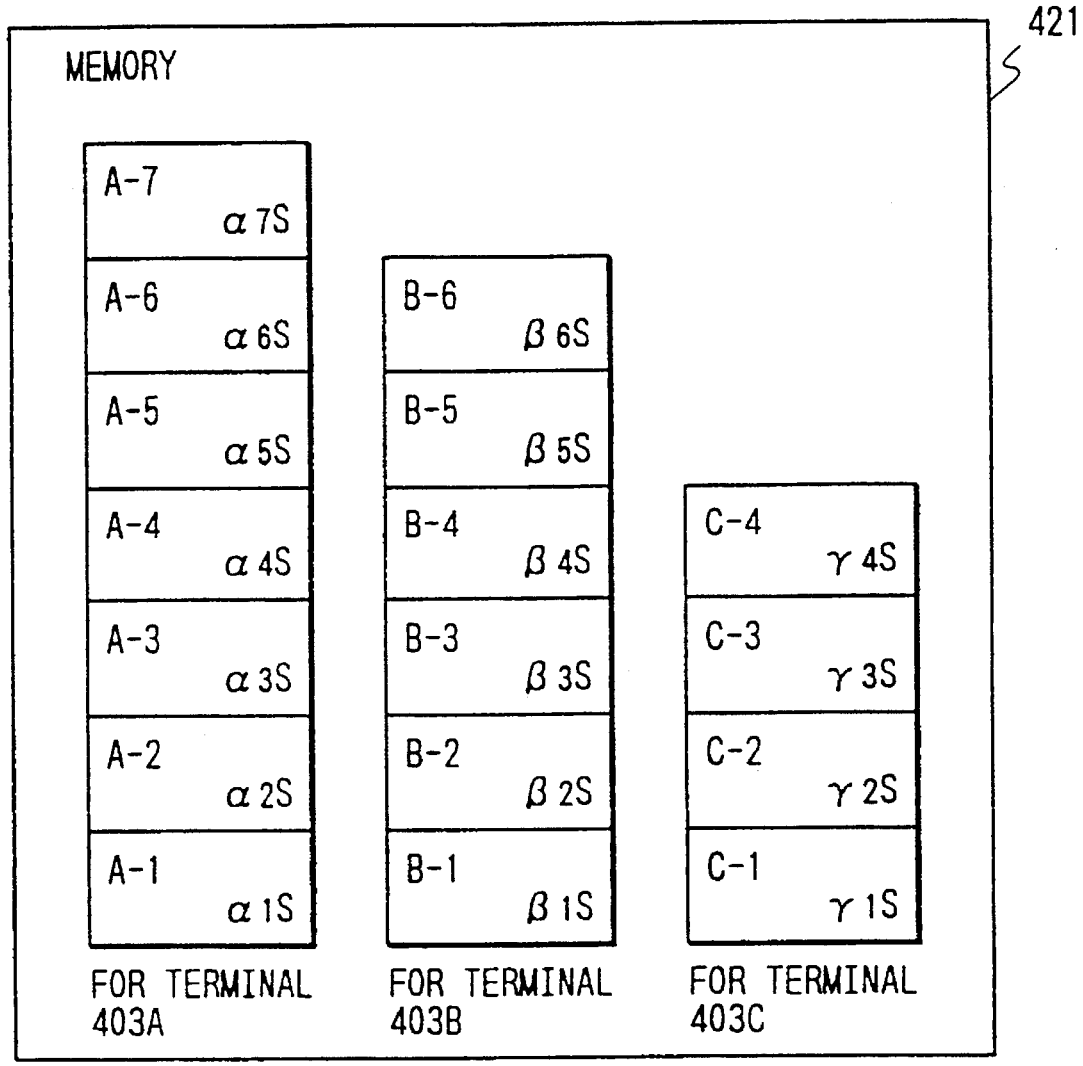
FIG. 34 is a diagram showing use conditions of the memory of FIG. 33.

FIG. 34 shows an example of the pre-read data in the cache memory 421. In the example of FIG. 34, the pre-read data contains pages A-1, A-2, A-3, A-4, A-5, A-6, and A-7 required by the terminal device 403A, pages B-1, B-2, B-3, B-4, B-5, and B-6 required by the terminal device 403B, and pages C-1, C-2, C-3, and C-4 required by the terminal device 403C. Each of the pre-read pages A-1, A-2, A-3, A-4, A-5, A-6, and A-7 includes information $\alpha nS$ representing a time (an interval) during which the page A-n is stored in the cache memory 421. The timer 423 calculates the sum of the store intervals which is given as follows.

$$\alpha 1S+\alpha 2S+\alpha 3S+\alpha 4S+\alpha 5S+\alpha 6S+\alpha 7S$$

Similarly, each of the pre-read pages B-1, B-2, B-3, B-4, B-5, and B-6 includes information $\beta nS$ representing a time (an interval) during which the page B-n is stored in the cache memory 421. The timer 423 calculates the sum of the store intervals which is given as follows.

$$\beta 1S+\beta 2S+\beta 3S+\beta 4S+\beta 5S+\beta 6S$$

Similarly, each of the pre-read pages C-1, C-2, C-3, and C-4 includes information $\gamma nS$ representing a time (an interval) during which the page C-n is stored in the cache memory 421. The timer 423 calculates the sum of the store intervals which is given as follows.

$$\gamma 1S+\gamma 2S+\gamma 3S+\gamma 4S$$

The pages A-1, B-1, and C-1 are currently subjected to access, or will be firstly subjected to access. When access to the page A-1 is completed, the page A-1 is removed from the cache memory 421 and the page A-2 is moved to the region of the cache memory 421 which is previously occupied by the page A-1. Such a data downward movement is executed for each of the other pages A-3, A-4, A-5, A-6, and A-7. In some cases, although only the four pages C-1, C-2, C-3, and C-4 are pre-read with respect to the terminal device 403C, the store time sum related to the terminal device 403C is equal to or greater than the store time sums related to the terminal devices 403A and 403B.

Figure 35:
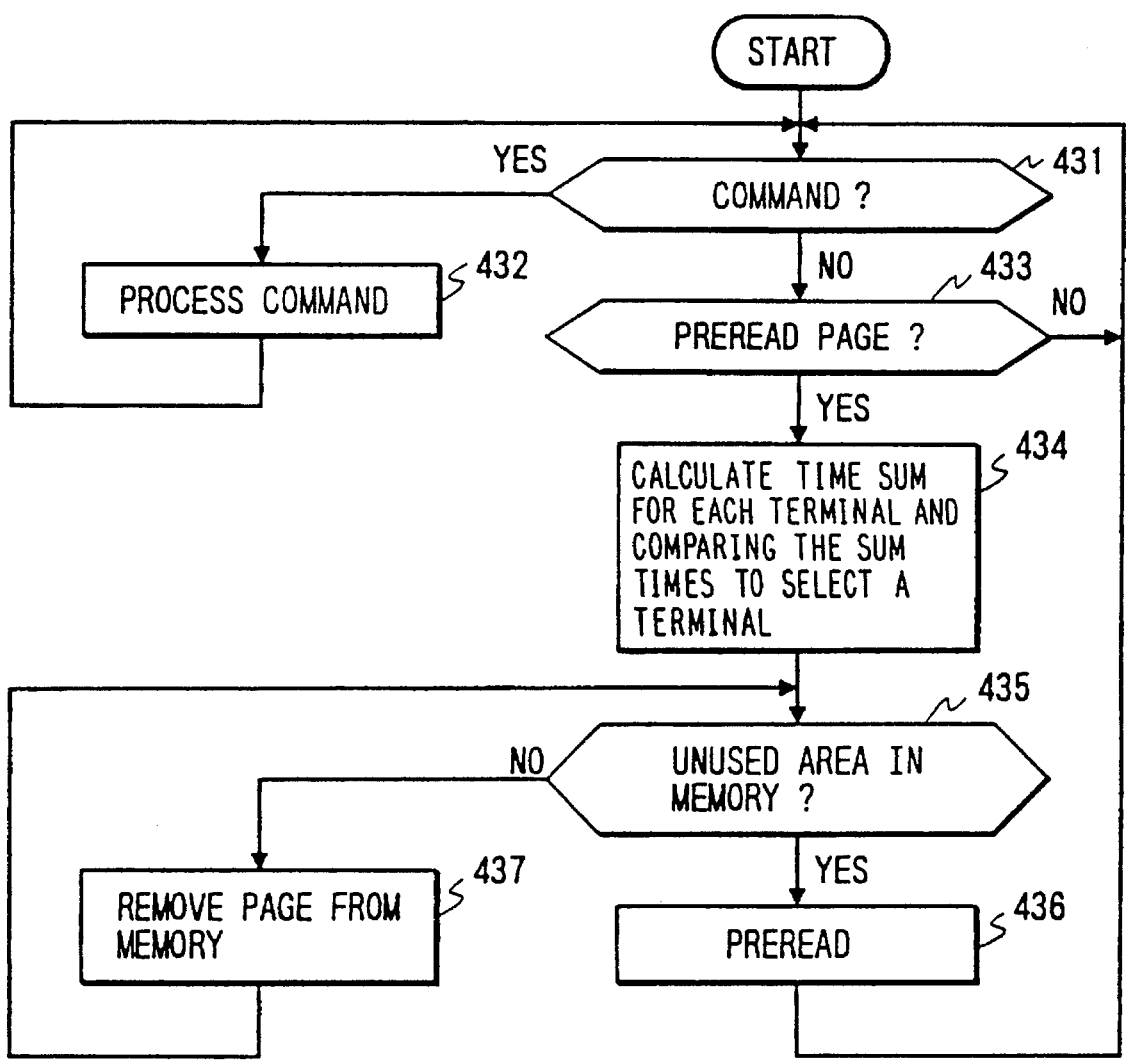
FIG. 35 is a flowchart of a program operating the controller of FIG. 33.

The controller 422 includes a combination of a processing section, a ROM, a RAM, and an input/output section. The controller 422 operates in accordance with a program stored in the ROM. FIG. 35 is a flowchart of the program.

As shown in FIG. 35, a first step 431 of the program decides whether or not a command is received from the terminal devices 403A, 403B, and 403C. When a command is received from the terminal devices, the program advances to a step 432. When a command is not received from the terminal devices, the program advances to a step 433.

The step 432 executes the received command. After the step 432, the program returns to the step 431.

The step 433 checks whether or not a page (pages) to be pre-read is present. When such a page is present, the program advances to a step 434. Otherwise, the program returns to the step 431.

The step 434 controls the timer 423 so as to calculate the store time sums for the terminal devices 403A, 403B, and 403C. In addition, the step 434 compares the calculated store time sums, and selects one of the terminal devices 403A, 403B, and 403C by referring to the result of the comparison. With respect to the selected terminal device, the controller 422 will execute a step of pre-reading a page (pages) from the store unit 401, and a step of storing the pre-read page (pages) into the cache memory 421. After the step 434, the program advances to a step 435.

The step 435 checks whether or not an unoccupied area is present in the cache memory 421. When an unoccupied area is present, the program advances to a step 436. Otherwise, the program advances to a step 437.

The step 436 executes a step of pre-reading a page (pages) from the store unit 401, and a step of storing the pre-read page (pages) into the cache memory 421. After the step 436, the program returns to the step 431.

The step 437 removes the pre-read page from the cache memory 421 to provide an unoccupied area in the cache memory 421, the removed page being required by the terminal device relating to the longest store time sum and being pre-read latest. After the step 437, the program returns to the step 435.

Figure 36:
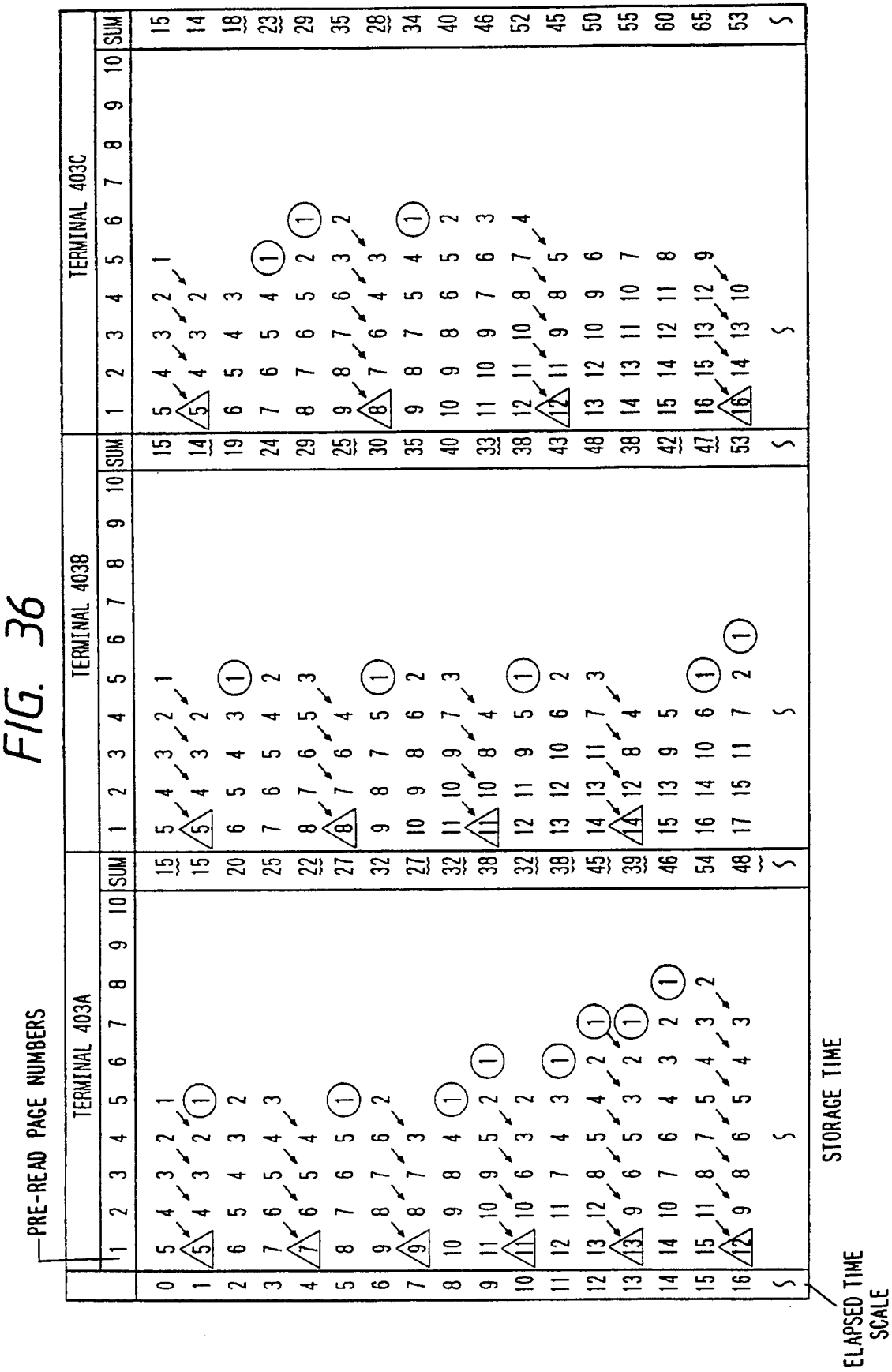
FIG. 36 is a diagram showing use conditions of the memory of FIG. 33.

FIG. 36 shows an example of movement of pre-read data in the cache memory 421. In FIG. 36, numerals 1–10 which are written below the elongated rectangles containing the expressions of the terminals 403A–403C denote pre-read page numbers respectively. In addition, numerals 1–16 in the left-hand column denote elapsed times (second) respectively. The three largest rectangles in FIG. 36 contain horizontal sequences of numerals which correspond to the elapsed times respectively. The numerals in each horizontal sequence denote the store intervals (times) of the pre-read pages respectively. For example, at an elapsed time of zero second, the numeral 5 in a horizontal sequence of 5, 4, 3, 2, and 1 denotes that the page 1 is stored for five seconds, and the numeral 1 in the sequence denotes that the page 5 is stored for one second. Numerals in the columns for the sums denote the sums of the store intervals of the pages. In FIG. 36, each of the small triangles denotes that the page in the related position is moved out of the cache memory 421, and the next page is moved to that position therefor. The numeral in each of small triangles denotes the store interval. For example, the numeral 5 in the small triangle in a horizontal sequence of 5, 4, 3, 2, and 1 corresponding to an elapsed time of one second denotes the store interval of the new page 1 which results from the fact that the old page 1 is moved out of the cache memory 421 at an elapsed time of zero second and the page 2 having a store interval of four seconds is moved to the position of the page 1 therefor, and then one second elapses. In FIG. 36, each of the small circles denotes a newly pre-read page, and the numeral in each small circle denotes the store interval of the newly pre-read page. In FIG. 36, each of the store time sums with the waved underlines is the smallest among a set of the store time sums which corresponds to a common elapsed time.

The data pre-reading process will be described with reference to FIG. 36. Assumed conditions are as follows. The terminal device 403A reads out data from the cache memory 421 at intervals of three seconds. The terminal device 403B reads out data from the cache memory 421 at intervals of four seconds. The terminal device 403C reads out data from the cache memory 421 at intervals of five seconds. Steps of pre-reading one-page data are executed at intervals of one second.

As shown in FIG. 36, at an elapsed time of zero second, five-page data is already pre-read, and the pre-read five-page data is stored in the cache memory 421 for each of the terminal devices 403A–403C. In addition, all the store interval sums related to the terminal devices 403A–403C are equal to 15 seconds. In this case, one of the terminal devices 403A–403C which provides the shortest data read-out intervals, that is, the terminal device 403A, is selected as a terminal device with which a data pre-reading step will be executed next. Thus, the store interval sum related to the terminal device 403A is provided with the waved underline.

As shown in FIG. 36, at an elapsed time of one second, with respect to the terminal device 403A, the page 1 is read out from the cache memory 421 and the page 2 is moved to the position of the page 1. In addition, the pages 3, 4, and 5 are moved to the positions of the pages 2, 3, and 4 respectively. The elapsed time of one second increments the respective store interval numerals by one. The position of the page 5 is opened, and a one-page pre-reading step is executed and a newly pre-read page is stored into the position of the page 5. With respect to each of the terminal devices 403B and 403C, the page 1 is read out from the cache memory 421 and the page 2 is moved to the position of the page 1, and the pages 3, 4, and 5 are moved to the positions of the pages 2, 3, and 4 respectively. With respect to each of the terminal devices 403B and 403C, a one-page pre-reading process is unexecuted at this stage. At an elapsed time of one second, the store interval sums related to the terminal devices 403B and 403C are the smallest. Since the terminal device 403B provides the shorter data read-out intervals than those provided by the terminal device 403C, the terminal device 403B is selected as a terminal device with which a data pre-reading step will be executed next.

In the case where the sum of pre-read pages corresponds to more than the capacity of the cache memory 421, one of the terminal devices 403A–403C which relates to the greatest store interval sum is selected, and the latest pre-read page for the selected terminal device is removed from the cache memory 421 to provide an unoccupied area of the cache memory 421. Then, a page for the terminal device which relates to the smallest store interval sum is pre-read and is written into the unoccupied area of the cache memory 421.

DESCRIPTION OF THE EIGHTH PREFERRED EMBODIMENT

Figure 37:
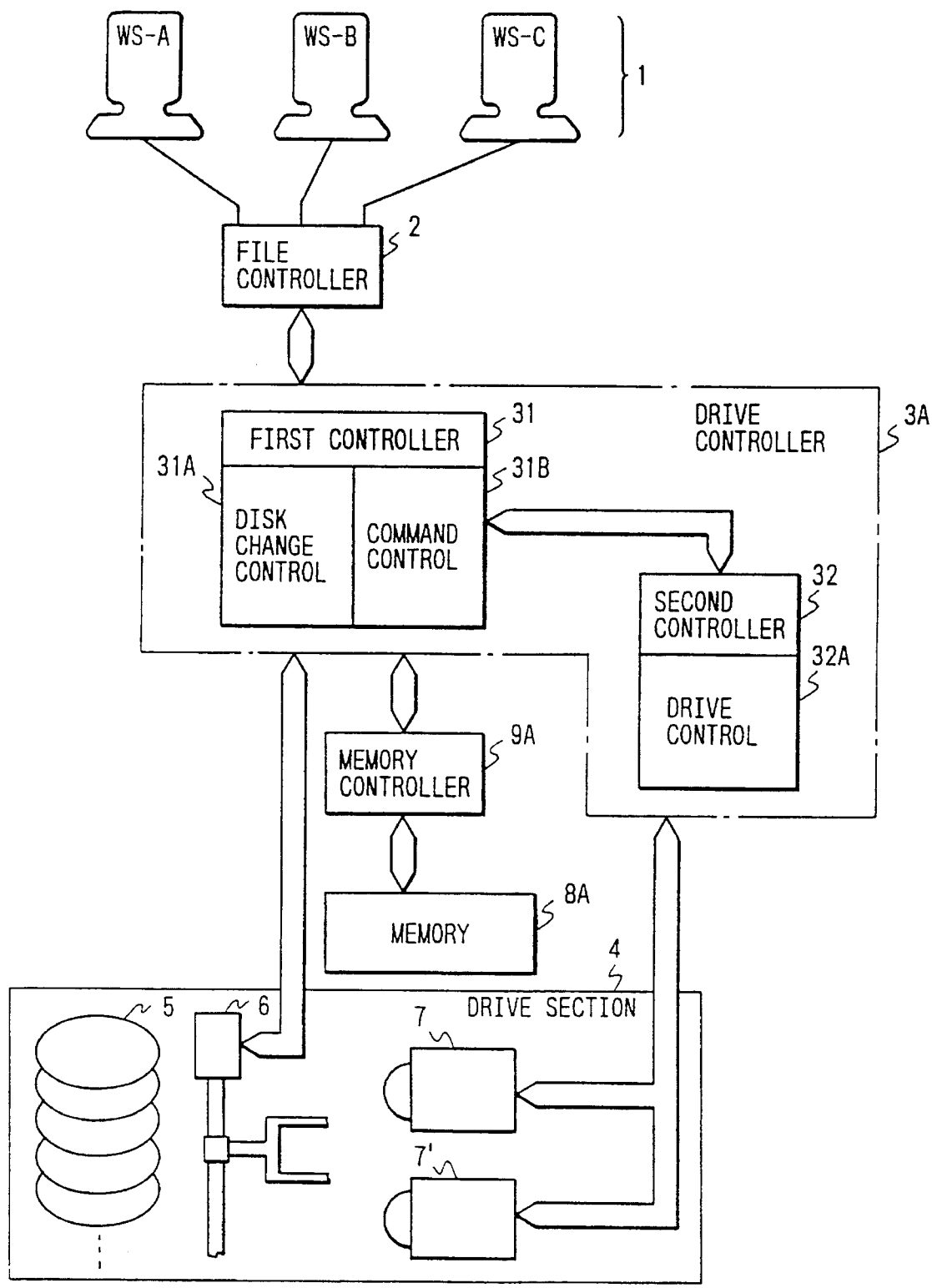
FIG. 37 is a block diagram of an electronic file system according to an eighth embodiment of this invention.

FIG. 37 shows an eighth embodiment of this invention which is similar to the embodiment of FIGS. 8–10(*c*) except that the eighth embodiment includes a modified memory 8A and a modified memory controller 9A.

Figure 38:
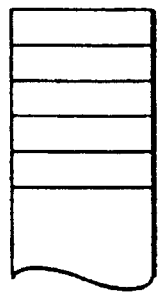
FIG. 38 is a diagram showing the relation among the memory, page management tables, and a surplus management table in the system of FIG. 37.

The memory 8A is divided into blocks which correspond to pages respectively. As shown in FIG. 38, there are three page management tables and a surplus management table in the memory 8A. The page management tables are used for work stations WS-A, WS-B, and WS-C respectively. The page management tables are used in managing memory blocks. Under conditions shown in FIG. 38, five pages A-1, A-2, A-3, A-4, and A-5 are pre-read for the work station WS-A, and two pages B-1 and B-2 are pre-read for the work station WS-B and two pages C-1 and C-2 are pre-read for the work station WS-C. Each of the page management tables has a capacity corresponding to 15 pages. Sixteenth and later pages for each of the work stations WS-A, WS-B, and WS-C are managed by use of the surplus management table. The surplus management table can be used for any of the work stations WS-A, WS-B, and WS-C.

Figure 39A:
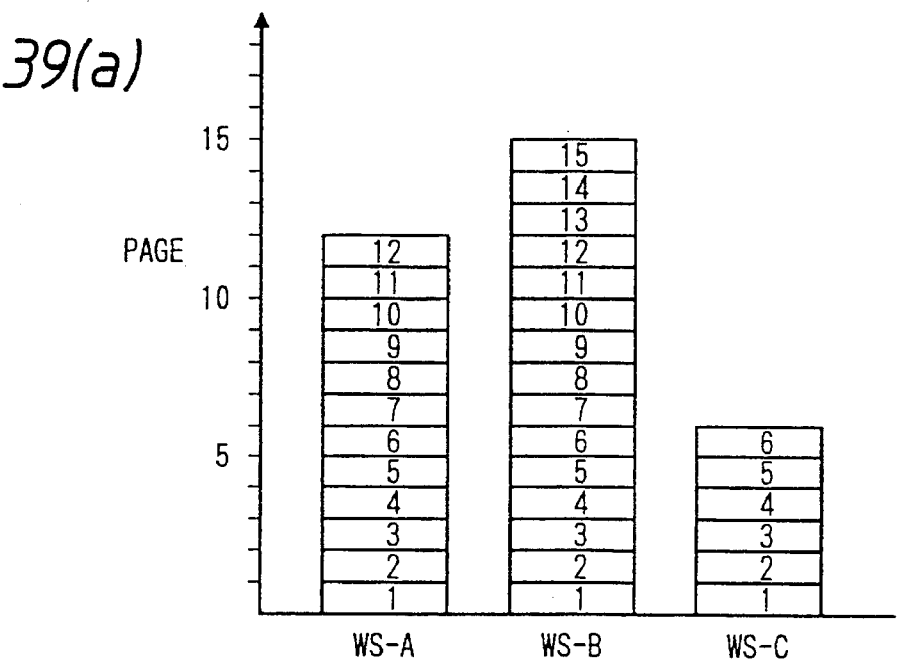
Figure 39B:
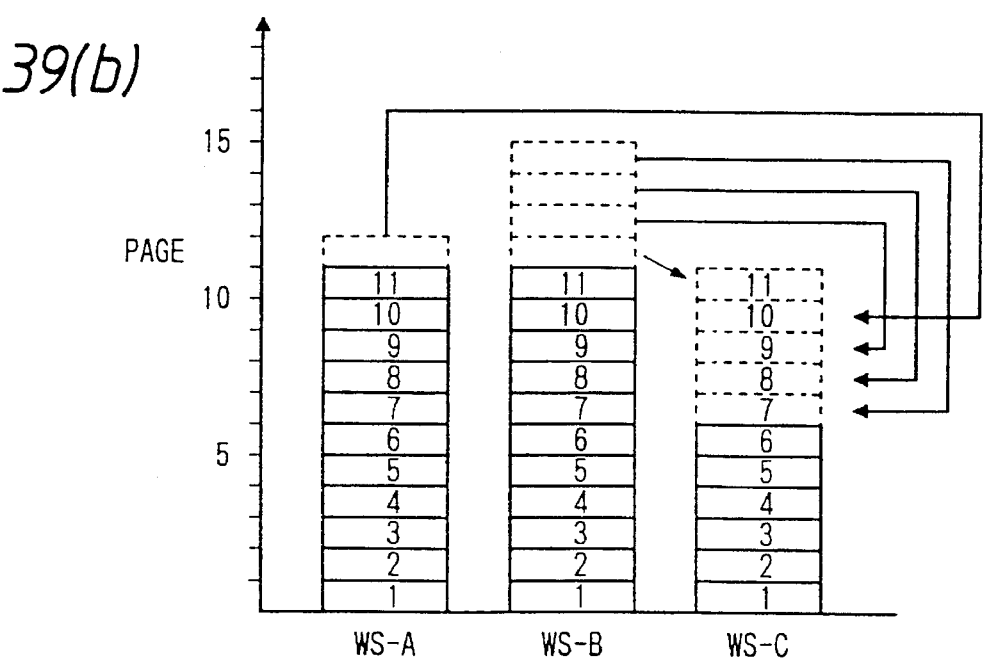

Under conditions shown in FIG. 39(*a*), 12 pages are pre-read for the work station WS-A, and 15 pages are pre-read for the work station WS-B and 6 pages are pre-read for the work station WS-C. With respect to each of the work stations WS-A, WS-B, and WS-C, the pre-read pages are sequentially numbered. The number for each page determines a weight. Specifically, the greater number provides a smaller weight. Under the conditions shown in FIG. 39(*a*), when the work station WS-C requires pre-reading other five pages, small-weight memory blocks for the work stations WS-A and WS-B are released from the work stations WS-A and WS-B and are newly allotted to the work station WS-C in dependence upon the minimums of the weights of the pre-read pages for the work stations WS-A, WS-B, and WS-C. In FIG. 39(*a*), the minimum of the weights of the pre-read pages for the work station WS-C is smaller than those for the work stations WS-A and WS-B. In addition, the minimum of the weights of the pre-read pages for the work station WS-B is larger than that for the work station WS-A. Thus, as shown in FIG. 39(*b*), one memory block is released from the work station WS-A and four memory blocks are released from the work station WS-B, and the released memory blocks are newly allotted to the work station WS-C. As a result, the new minimums of the weights of the pre-read pages for the work stations WS-A, WS-B, and WS-C are equal to each other.

Figure 40A:
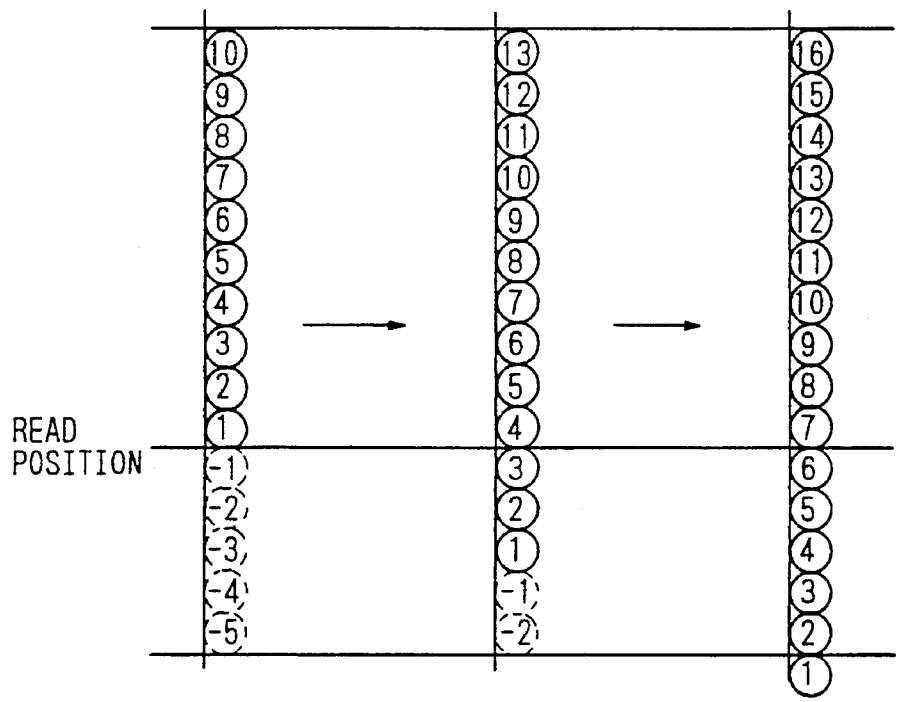
FIGS. 40(a) and 40(b) are diagrams showing conditions of page management tables in the system of FIG. 37.

The left-hand part of FIG. 40(*a*) shows conditions where 10 pre-read pages are stored in the memory 8A. Pages -1, -2, -3, -4, and -5 are imaginary. The imaginary pages are introduced to enable an appropriate weighting process. In FIG. 40(*a*), the intermediate horizontal line denotes a position of data which is currently read out by a work station 1. The intermediate part of FIG. 40(*a*) shows conditions where 13 pre-read pages are stored in the memory 8A and the page 4 is currently read out by a work station. In this case, imaginary pages -1 and -2 are introduced. The right-hand part of FIG. 40(a) shows conditions where 16 pre-read pages are stored in the memory 8A and the page 7 is currently read out by a work station. In this case, the page 1 overflows from a related page management table, and the page 1 is managed by the surplus management table.

Figure 40B:
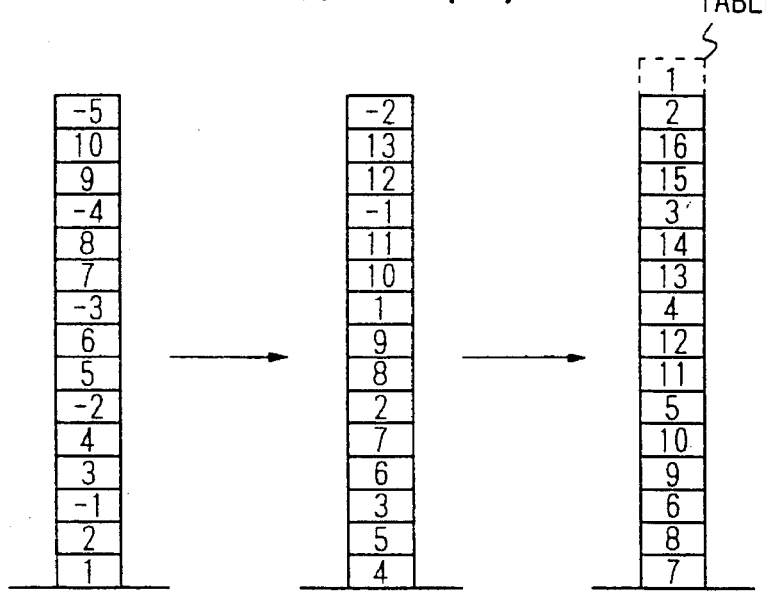

FIG. 40(b) shows weights of respective pages. In FIG. 40(b), a box in a higher position has a smaller weight. FIG. 40(b) has a left-hand part, an intermediate part, and a right-hand part which correspond to the left-hand part, the intermediate part, and the right-hand part of FIG. 40(a) respectively. Under the conditions shown in the left-had part of FIG. 40(a), real pages and imaginary pages are alternated at a rate of 2:1 in a manner such that a sequence of the page 1 and the page 2 is followed by the page -1 and a sequence of the page 3 and the page 4 are followed by the page -2. The intermediate part of FIG. 40(b) shows weighting conditions which occur when 13 pre-read pages are transferred to the memory 8A. The imaginary pages are introduced to enable weight comparison in the case where less than 15 pre-read pages are transferred to the memory 8A for one work station while 15 pre-read pages are stored in the memory 8A for another work station.

It is now assumed that the weighting conditions shown in the left-hand part of FIG. 40(b) relate to the work station WS-A, and the weighting conditions shown in the right-hand part of FIG. 40(b) relate to the work station WS-C. The page 3 in the fourth lowest position of the left-hand part of FIG. 40(b) is equal in weight to the page 9 in the fourth lowest position of the right-hand part of FIG. 40(b). If the page -1 in the third lowest position of the left-hand part of FIG. 40(b) is absent, the page 3 is in the third lowest position and has a greater weight. To prevent such an increase in weight, an imaginary page or imaginary pages are introduced in the case where less than 15 pre-read pages are stored in the memory 8A.

Figure 41:
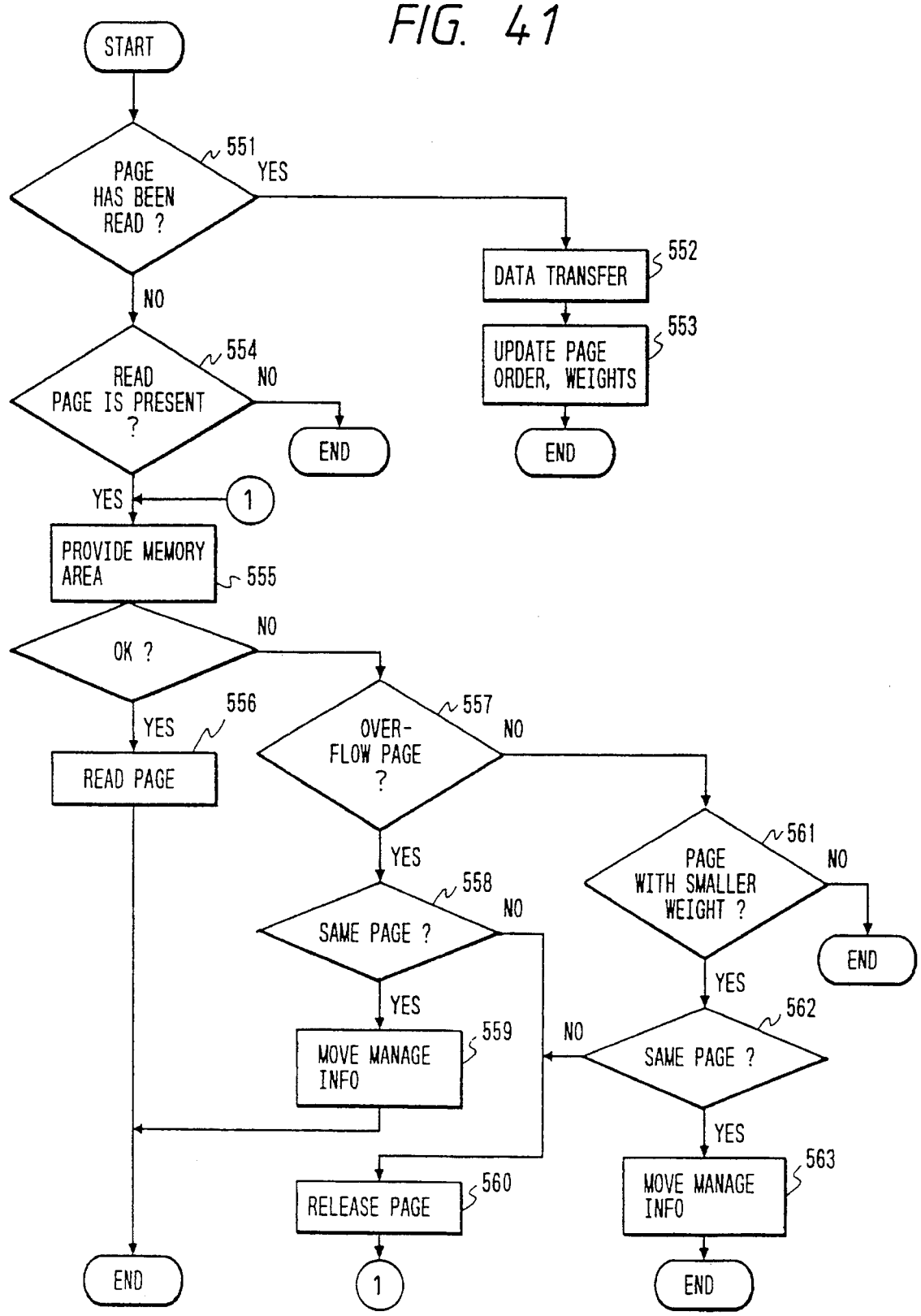
FIG. 41 is a flowchart of a program operating the memory controller of FIG. 37.

The memory controller 9A includes a combination of a processing section, a ROM, a RAM, and an interface. The memory controller 9A operates in accordance with a program stored in the ROM. FIG. 41 is a flowchart of the program. It should be noted that, in the following description related to FIG. 9, data (information) representing pages of documents are usually referred to as pages for an easy understanding.

As shown in FIG. 41, a first step 551 of the program checks whether or not a page (pages) which should be read out from a multi-drive section 4 is already stored in the memory 8A. When such a page (pages) is already stored in the memory 8A, the program advances to a step 552. Otherwise, the program advances to a step 554.

The step 552 transfers the stored page (pages) from the memory 8A to the related work station. A step 553 following the step 552 updates the page arrangement and the weighting conditions (see FIGS. 40(a) and 40(b)). After the step 553, the present execution cycle of the program is ended.

The step 554 checks whether or not a page (pages) which should be subjected to read-out is present. When such a page (pages) is present, the program advances to a step 555. Otherwise, the present execution cycle of the program is ended.

The step 555 checks whether or not an area for storing read-out page (pages) can be provided in the memory 8A. When such an area can be provided in the memory 8A, the program advances to a step 556. Otherwise, the program advances to a step 557.

The step 556 provides an area for storing read-out page (pages) in the memory 8A. In addition, the step 556 reads out the required page (pages) and stores the read-out page (pages) into the provided area in the memory 8A. After the step 556, the present execution cycle of the program is ended.

The step 557 checks whether or not the number of pages increases above 15 so that an overflow page which is registered in the surplus management table is present. When an overflow page is present, the program advances to a step 558. When an overflow page is absent, the program advances to a step 561.

The step 558 checks whether or not a page equal to the required page is already stored into the memory 8A by a command from another work station. When such a page is already stored into the memory 8A, the program advances to a step 559 which transfers the present page to the page management table of the related work station. Otherwise, the program advances to a step 560 which removes a page from the surplus management table to provide an unoccupied area in the memory 8A. After the step 559, the present execution cycle of the program is ended. After the step 560, the program returns to the step 555.

The step 561 checks whether or not a page having a smaller weight than the weight of the required page is present in the page management tables (see FIGS. 40(a) and 40(b)). When such a page is present, the program advances to a step 562. Otherwise, the present execution cycle of the program is ended.

The step 562 checks whether or not the required page is already stored into the memory 8A by a command from another work station. When the required page is already stored into the memory 8A, the program advances to a step 563 which transfers the present page to the page management table of the related work station. Otherwise, the program advances to the step 560 which removes a page from the surplus management table to provide an unoccupied area in the memory 8A as described previously. After the step 563, the present execution cycle of the program is ended. After the step 560, the program returns to the step 555 as described previously.

What is claimed is:

1. An electronic file system comprising:

a recording-media drive for driving a plurality of recording media to read out data therefrom;

a plurality of terminal devices for indicating designated data stored in the recording media;

memory means for temporarily storing designated data when the designated data is indicated by the terminal devices;

control means, being responsive to access information from said terminal devices where said access information designates data to be indicated by the terminal devices, for activating the recording-media drive to read out the designated data from the recording media on a page by page basis, and for transmitting the read-out designated data to the terminal devices;

means for, while a first page of the read-out designated data is being indicated by the terminal devices, activating the recording-media drive to pre-read subsequent pages of the designated data from the recording media in response to the access information and storing the subsequent pages of the read-out designated data into the memory means;

counter means for counting a store time for each page of read-out designated data in the memory means for each of the terminal devices, where said store time constitutes a time during which a respective page is stored in said memory means; and means for executing pre-read with respect to one of the terminal devices which has a smallest sum of the store times counted by the counter means.

2. An electronic file system comprising:

a recording-media drive for driving a plurality of recording media to read out data therefrom;

a plurality of terminal devices for indicating designated data stored in the recording media;

memory means for temporarily storing designated data when the designated data is indicated by the terminal devices;

control means, being responsive to access information from said terminal devices, said access information designating data to be indicated by the terminal devices, for activating the recording-media drive to read out the designated data from the recording media on a page by page basis, and for transmitting the readout designated data to the terminal devices;

means for, while a first page of the read-out designated data is being indicated by the terminal devices, activating the recording-media drive to pre-read subsequent pages of the designated data from the recording media in response to the access information and storing the subsequent pages of the designated data into the memory means;

counter means for counting a store time of each page of read-out designated data in the memory means for each of the terminal devices;

means for executing pre-read with respect to one of the terminal devices which has a smallest sum of the store times counted by the counter means; and means for, in cases where the memory means is fully occupied, deleting data designated by one of the terminal devices which has a greatest sum of the store times where said data to be deleted is a page pre-read latest for one of said terminal devices which has a greatest sum of store times.

3. An electronic file system comprising:

a recording-media drive for driving a plurality of recording media to read out data therefrom;

a terminal device for indicating designated data stored in the recording media;

control means, being responsive to access information from said terminal devices, said access information designating data to be indicated by the terminal device, for activating the recording-media drive to read out designated data from the recording media on a page by page basis, and for transmitting designated data readout from the recording media to the terminal device;

memory means for storing a plurality of pages of first data and second data, the second data having been indicated while the first data is being indicated by the terminal in response to the access information; and management means for differentiating stored page numbers of the first data and the second data on a page by page basis.

4. The electronic file system of claim 3, wherein the terminal device comprises a plurality of terminal units, and the management means comprise page management tables used for managing data corresponding to a predetermined number of pages for the terminal units, and surplus management tables used for managing data corresponding to pages exceeding said predetermined number of pages for the terminal units.

* * * * *